(12) United States Patent
Zhou et al.

(10) Patent No.: US 11,856,122 B2
(45) Date of Patent: Dec. 26, 2023

(54) LATERAL FINGERPRINT RECOGNITION APPARATUS FOR ELECTRONIC DEVICE

(71) Applicant: Honor Device Co., Ltd., Shenzhen (CN)

(72) Inventors: Guotong Zhou, Shenzhen (CN); Dong Ma, Shenzhen (CN); Xinwen Xu, Shenzhen (CN); Yan Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 99 days.

(21) Appl. No.: 17/608,160

(22) PCT Filed: May 9, 2020

(86) PCT No.: PCT/CN2020/089308
§ 371 (c)(1),
(2) Date: Nov. 2, 2021

(87) PCT Pub. No.: WO2020/224655
PCT Pub. Date: Nov. 12, 2020

(65) Prior Publication Data
US 2022/0232114 A1 Jul. 21, 2022

(30) Foreign Application Priority Data
May 9, 2019 (CN) .......................... 201910383509.1

(51) Int. Cl.
*H04M 1/23* (2006.01)
*G06V 40/13* (2022.01)
*H04M 1/02* (2006.01)

(52) U.S. Cl.
CPC ........ *H04M 1/236* (2013.01); *G06V 40/1329* (2022.01); *H04M 1/0277* (2013.01); *H04M 2201/06* (2013.01)

(58) Field of Classification Search
CPC ............... H04M 1/236; H04M 1/0277; H04M 2201/06; G06V 40/1329
See application file for complete search history.

(56) References Cited

U.S. PATENT DOCUMENTS 9,030,440 B2   5/2015   Pope et al.
9,129,757 B2   9/2015   Kanbayashi et al.
(Continued)

FOREIGN PATENT DOCUMENTS

CN   104282473 A   1/2015
CN   204497100 U   7/2015
(Continued)

OTHER PUBLICATIONS

The international search report dated Aug. 12, 2020 in PCT Application No. PCT/CN2020/089308.

*Primary Examiner* — Yuwen Pan
*Assistant Examiner* — Angelica Perez
(74) *Attorney, Agent, or Firm* — Fish & Richardson P.C.

(57) ABSTRACT

An electronic device is provided. A lateral fingerprint recognition apparatus is in contact with a function button. An accommodating structure is arranged in the lateral fingerprint recognition apparatus. A stopping assembly is arranged on a side of a fingerprint hole close to the function button. Inserting a partial area of the stopping assembly into the accommodating structure enables the lateral fingerprint recognition apparatus, when pressed, to move in movement space of the accommodating structure on the side of the fingerprint hole close to the function button, so as to limit a displacement amount of the lateral fingerprint recognition apparatus within a specific range, implementing the functions of the lateral fingerprint recognition apparatus and of
(Continued)

the function button, and preventing the lateral fingerprint recognition apparatus from being displaced from the originally designed position.

17 Claims, 18 Drawing Sheets

(56) References Cited

U.S. PATENT DOCUMENTS

| | | |
|---|---|---|
| 9,251,974 B2 | 2/2016 | Liu |
| 9,697,409 B2 | 7/2017 | Myers |
| 9,767,971 B2 | 9/2017 | Hisano et al. |
| 10,102,361 B2 | 10/2018 | Jiang et al. |
| 11,202,385 B2 | 12/2021 | Kim et al. |
| 2008/0049980 A1 | 2/2008 | Castaneda et al. |
| 2015/0248209 A1 | 9/2015 | Kim et al. |
| 2017/0103252 A1 | 4/2017 | Li et al. |
| 2018/0046281 A1 | 2/2018 | Pi et al. |
| 2018/0365472 A1 | 12/2018 | Cai |
| 2020/0137911 A1* | 4/2020 | Kim .................... H05K 5/0247 |
| 2022/0232114 A1 | 7/2022 | Zhou et al. |

FOREIGN PATENT DOCUMENTS

| | | | | |
|---|---|---|---|---|
| CN | 204791054 U | | 11/2015 | |
| CN | 105206452 A | * | 12/2015 | |
| CN | 105206452 A | | 12/2015 | |
| CN | 205068228 U | | 3/2016 | |
| CN | 106469624 A | | 3/2017 | |
| CN | 106603762 A | * | 4/2017 | |
| CN | 106603762 A | | 4/2017 | |
| CN | 206224513 U | | 6/2017 | |
| CN | 110262626 A | | 9/2019 | |
| JP | 2001307592 A | | 11/2001 | |
| JP | 2013235802 A | | 11/2013 | |
| JP | 2016042415 A | | 3/2016 | |
| JP | 2017098858 A | | 6/2017 | |
| KR | 20170094898 A | | 8/2017 | |
| RU | 2639648 C1 | | 12/2017 | |
| RU | 2643460 C2 | | 2/2018 | |
| WO | 2019095100 A1 | | 5/2019 | |
| WO | WO-2019095100 A1 | * | 5/2019 | ............... G06F 1/16 |
| WO | 2020085680 A1 | | 4/2020 | |

* cited by examiner (a)

(b)

(a)

(b)

(a)

(b)

(a)

(b)

(a)

(b)

(a)

(b)

(c)

(a)

(b)

(a)

(b)

LATERAL FINGERPRINT RECOGNITION APPARATUS FOR ELECTRONIC DEVICE

CROSS-REFERENCE TO RELATED APPLICATIONS

This application is a National Stage of International Application No. PCT/CN2020/089308, filed on May 9, 2020, which claims priority to Chinese Patent Application No. 201910383509.1, filed on May 9, 2019. The disclosures of the a which is incorporated herein by reference in its entirety.

TECHNICAL FIELD

This application relates to the field of electronic devices, and more specifically, to an electronic device equipped with a lateral fingerprint recognition apparatus.

BACKGROUND

With the continuous popularization of full screens, arrangement and mounting of fingerprint recognition apparatuses (referred to as lateral fingerprint recognition apparatuses) on sides of electronic devices have been applied. However, arranging a fingerprint recognition apparatus on the side of the electronic device leads to too many buttons on the side, affecting the conciseness and beauty of the electronic device. In addition, adding a button may require adjustment of positions of function buttons such as the volume button and the power button. This causes inconvenience to daily use of the device by users, and degrades user experience.

SUMMARY

This application provides an electronic device. A lateral fingerprint recognition apparatus and a function button are combined into a whole, and a stopping assembly is arranged. Through cooperation between the lateral fingerprint recognition apparatus and the stopping assembly, a displacement amount of the lateral fingerprint recognition apparatus is limited within a specific range, implementing the functions of the lateral fingerprint recognition apparatus and of the function button, and preventing the lateral fingerprint recognition apparatus from being displaced from the originally designed position (for example, the lateral fingerprint recognition apparatus moves toward the outside of a fingerprint hole by an excessive displacement). Thus, the lateral fingerprint recognition apparatus can be well secured onto the electronic device.

According to a first aspect, an electronic device is provided, where the electronic device includes:
  a middle frame, which is provided with a first function button fixedly connected to the middle frame, where a fingerprint hole is arranged on a side surface of the middle frame;
  a fingerprint recognition apparatus passing through the fingerprint hole, where the fingerprint recognition apparatus includes an accommodating structure, and is in contact with the first function button; and
  a stopping assembly, which is arranged on a side of the fingerprint hole close to the first function button, and is fixedly connected to the middle frame, where the stopping assembly includes a retaining wall structure, and a partial area of the retaining wall structure is inserted into the accommodating structure; in a first direction, a size of the partial area is smaller than a size of movement space, and the movement space includes space of the accommodating structure on the side of the fingerprint hole close to the first function button; in a second direction of a first plane and/or a third direction of the first plane, a size of the retaining wall structure is greater than a size of the fingerprint hole; the first direction is perpendicular to the side surface of the middle frame, the first plane is parallel to the side surface of the middle frame, the second direction is a thickness direction of the middle frame, and the third direction is perpendicular to the second direction.

According to the electronic device provided in this embodiment of this application, the stopping assembly on the side of the fingerprint hole close to the function button is arranged in the electronic device, the accommodating structure is arranged in the fingerprint recognition apparatus, and the partial area of the retaining wall structure of the stopping assembly is inserted into the accommodating structure. In the movement space formed by the space of the accommodating structure on the side of the fingerprint hole close to the first function button, in the direction perpendicular to the side surface of the middle frame, the size of the movement space is larger than the size of the partial area of the retaining wall structure inserted into the accommodating structure. In addition, in the thickness direction of the middle frame and/or in the direction perpendicular to the thickness direction of the middle frame and parallel to the side surface of the middle frame, the size of the retaining wall structure is larger than the size of the fingerprint hole. This can ensure that the fingerprint recognition apparatus moves only in the movement space of the accommodating structure under the action of external force, so as to limit the displacement amount of the fingerprint recognition apparatus within a specific range, implementing the functions of the fingerprint recognition apparatus and of the function button, and preventing the fingerprint recognition apparatus from being displaced from the originally designed position (for example, the fingerprint recognition apparatus moves toward the outside of a fingerprint hole by an excessive displacement). Thus, the fingerprint recognition apparatus can be well secured onto the electronic device.

Optionally, the fingerprint recognition apparatus includes a fingerprint recognition assembly, a flexible circuit board, and a reinforcement component. The fingerprint recognition assembly and the reinforcement component are respectively attached to two opposite surfaces of the flexible circuit board. The accommodating structure is arranged between the surface of the reinforcement component close to the first function button and the surface of the fingerprint recognition assembly attached to the flexible circuit board.

Optionally, the flexible circuit board includes a first part and a second part. The first part is arranged between the fingerprint recognition assembly and the reinforcement component. The first part includes an extension area stretching out of a first end of the fingerprint recognition assembly. The second part extends from an end of the extension area to the inside of the middle frame, and is fixedly connected to the middle frame.

Therefore, according to the electronic device provided in this embodiment of this application, an extension area stretching out of the end (for example, the first end) of the fingerprint recognition apparatus is added to the first part of the flexible circuit board, and the extension area can make the first part of the flexible circuit board have a specific redundant length. When the fingerprint recognition apparatus is repeatedly clicked or pressed, the first part of the flexible circuit board has a larger swing radius with the movement of the fingerprint recognition apparatus, so as to reduce deformation of the first part, thereby reducing possibility of fatigue fracture of the flexible circuit board, and increasing a service life of the flexible circuit board.

Optionally, the fingerprint recognition apparatus further includes a protective film. The protective film is attached to a first area on a surface close to the first part of the fingerprint recognition assembly, and the first area is close to the first end of the fingerprint recognition assembly.

Therefore, according to the electronic device provided in this embodiment of this application, at a position close to the first end of the fingerprint recognition assembly, the protective film is attached to the surface of the first part of the flexible circuit board close to the fingerprint recognition assembly. This can prevent the flexible circuit board from rubbing against an edge of the fingerprint hole in an area close to the first end of the fingerprint recognition assembly during movement, thereby increasing the service life of the flexible circuit board.

Optionally, the fingerprint recognition apparatus further includes a protruding component that is arranged on a surface of the reinforcement component facing the first function button, and the protruding component is in contact with the first function button.

Optionally, the surface of the reinforcement component facing the first function button includes a middle area and two end areas, and the middle area is provided with the protruding component of the reinforcement component; and the fingerprint recognition apparatus further includes an elastic member arranged on each of the end areas, and when any one end of the fingerprint recognition apparatus is pressed, the elastic member arranged on the end is in tight contact with the middle frame.

Therefore, according to the electronic device provided in this embodiment of this application, elastic members are arranged at both ends of the reinforcement component. This fills a gap between the reinforcement component and the middle frame. In addition, because the elastic member has good elasticity, when one end of the fingerprint recognition apparatus is clicked, the elastic member corresponding to the end is compressed and is in tight contact with the middle frame, well playing a restriction and support role. When the pressing is completed, the elastic member rebounds the fingerprint recognition apparatus, and the elastic member returns to an initial state of being flush with the middle frame. This can effectively avoid a single-side uplifting problem caused when one end of the fingerprint recognition apparatus is pressed, thereby improving stability of the fingerprint recognition apparatus.

Optionally, the elastic member is foam.

Optionally, the middle frame is further provided with a second function button, the second function button and the first function button are distributed in the third direction, and the protruding component is in contact with both the first function button and the second function button.

Therefore, according to the electronic device provided in this embodiment of this application, two function buttons (for example, the first function button and the second function button) are arranged on the middle frame, and the two function buttons are both in contact with the protruding component arranged on the reinforcement component, so as to form a support structure with a span. This support structure has higher stability and can effectively avoid a single-side uplifting problem caused when one end of the fingerprint recognition apparatus is pressed, thereby improving stability of the fingerprint recognition apparatus.

Optionally, the surface of the reinforcement component facing the first function button is a stepped surface, the stepped surface includes a concave area and a convex area, and the protruding component is arranged on the concave area.

Therefore, according to the electronic device provided in this embodiment of this application, the surface of the reinforcement component facing the function button is arranged as a stepped surface having a concave area and a convex area, and the protruding component is arranged on the concave area. This can combine the fingerprint recognition apparatus and the function button into a whole, thereby reducing the gap between the reinforcement component and the middle frame provided with the function button, and improving the stability of the fingerprint recognition apparatus when one end of the fingerprint recognition apparatus is clicked or pressed.

Optionally, each of the two ends of the reinforcement component is formed as a claw-shaped structure extending outward, and the accommodating structure is arranged between the surface of each claw-shaped structure facing away from the first function button and the surface of the fingerprint recognition assembly attached to the flexible circuit board.

Therefore, according to the electronic device provided in this embodiment of this application, the end of the reinforcement component is designed as the claw-shaped structure extending outward, and the accommodating structure is arranged between the surface of the claw-shaped structure facing away from the function button and the surface of the fingerprint recognition assembly attached to the flexible circuit board. On the one hand, the mechanical processing is simple, which can effectively reduce the costs and improve the processing efficiency. On the other hand, the structure is more stable and can well cooperate with the stopping assembly, making the restriction function more stable.

Optionally, the flexible circuit board includes a first part and a second part. The first part is arranged between the fingerprint recognition assembly and the reinforcement component. The first part includes an extension area stretching out of a first end of the fingerprint recognition assembly. The second part extends from an end of the extension area to the inside of the middle frame, and is fixedly connected to the middle frame.

The end of the reinforcement component close to the first end of the fingerprint recognition assembly is formed as a U-shaped structure, and two edges of the U-shaped structure extend outward in the third direction. The accommodating structure includes space formed by the inner surface of the U-shaped structure.

Therefore, according to the electronic device provided in this embodiment of this application, the end of the reinforcement component close to the first end of the fingerprint recognition assembly is arranged as the U-shaped structure, and the edge of the U-shaped structure close to the flexible circuit board is equivalent to adding a protective layer between the stopping assembly and the first part of the flexible circuit board, thereby reducing the possibility that the exposed area of the first part of the flexible circuit board that is close to the reinforcement component but is not attached to the reinforcement component is in contact with the stopping assembly, and thus protecting the flexible circuit board.

Optionally, the surface of the protruding component facing the first function button is a stepped surface, the stepped surface includes a convex area and a concave area, and the convex area is in contact with the first function button.

Therefore, according to the electronic device provided in this embodiment of this application, two ends of the surface of the protruding component facing the function button are arranged as a concave area, and the convex area in the middle is in contact with the function button. When the fingerprint recognition apparatus is pressed, extra contact between the surface of the protruding component facing the function button and a supporting member for fixing the function button can be reduced, thereby reducing unstable contact between the supporting member and the middle frame, improving the stability of the function button, and improving the stability of the electronic device.

Optionally, the protruding component is made of a non-metallic material.

Therefore, according to the electronic device provided in this embodiment of this application, the protruding component is made of a non-metallic material. Unlike a metal material, when the fingerprint recognition apparatus is pressed, the contact between the protruding component made of a non-metallic material and the function button can effectively reduce damage to the function button when the protruding component presses the function button.

Optionally, the fingerprint recognition apparatus includes a substrate, a pad area of the substrate is provided with a plurality of pads, and the pad area includes a side area close to an end of the pad area and a middle area except for the side area. An area of each pad in the side area is larger than an area of each pad in the middle area.

Therefore, according to the electronic device provided in this embodiment of this application, the area of each pad in the side area in which the pad is prone to failure is increased, so that the area of each pad in the side area is larger than an area of a pad in a remaining area. This can increase the contact area of the pad in the side area and reduce the stress, thereby improving the pressing resistance and fatigue resistance of the pad in the side area, increasing the service life of the pad, and further improving the reliability of the fingerprint recognition apparatus.

Optionally, the fingerprint recognition apparatus includes a substrate, a pad area of the substrate is provided with a plurality of pads, and the pad area includes a side area close to an end of the pad area and a middle area except for the side area. A quantity of pads in the side area is larger than a quantity of pads in the middle area.

Therefore, according to the electronic device provided in this embodiment of this application, the quantity of pads in the side area in which the pad is prone to failure is increased to increase a quantity of pads corresponding to each signal, so that when a pad for the same signal is damaged, another pad corresponding to the signal can be used normally, thereby improving the service life of the pad on the substrate as a whole, and further improving the reliability of the fingerprint recognition apparatus.

Optionally, the first function button is a power button.

Therefore, according to the electronic device provided in this embodiment of this application, in some scenarios, for example, in a scenario in which the position of the power button is closer to the position of the user's handheld device, or in a scenario in which the power button has only one button, combining the power button and the fingerprint recognition apparatus into a whole can effectively improve user experience and simplify design complexity.

Optionally, the reinforcement component is made of steel.

Optionally, the stopping assembly is made of steel.

DESCRIPTION OF EMBODIMENTS

The following describes technical solutions of this application with reference to accompanying drawings.

The electronic device in the embodiments of this application may be various possible devices equipped with a lateral fingerprint recognition apparatus. For example, the electronic device may be a mobile phone, a tablet computer, a watch, a wearable device, or the like.

Figure 1:
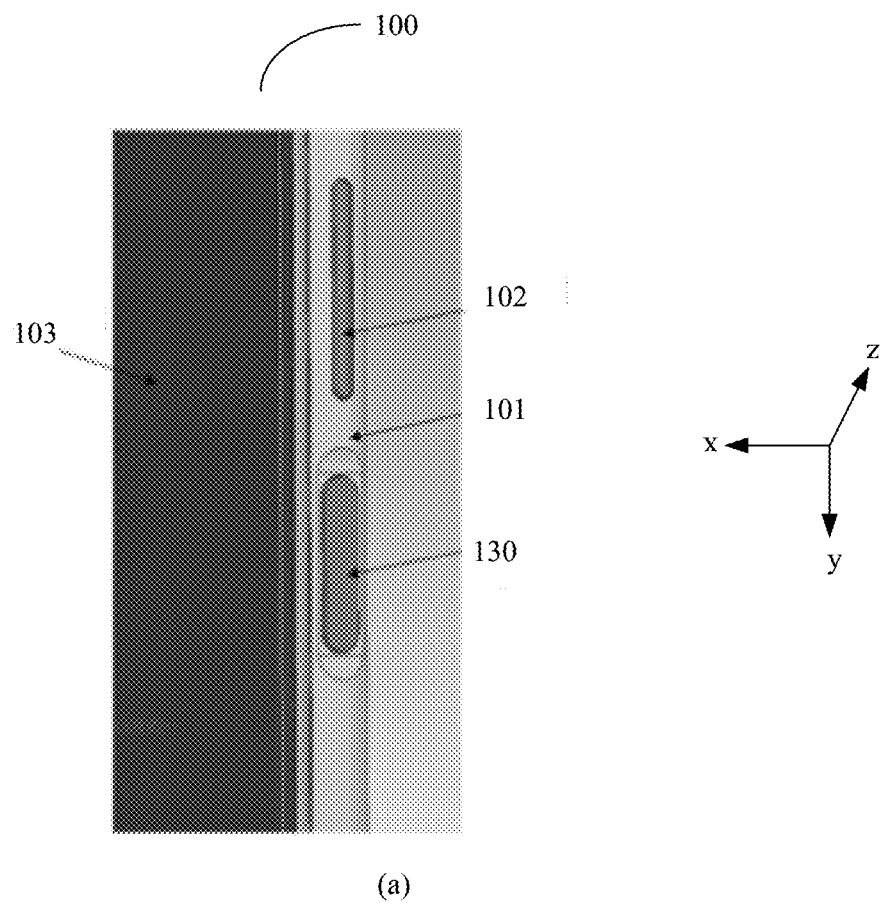
FIG. 1(a) is a schematic structural diagram of a partial area of an electronic device according to an embodiment of this application.
FIG. 1(b) is a schematic structural diagram of a middle frame on a yz plane according to an embodiment of this application.
Figure 1:
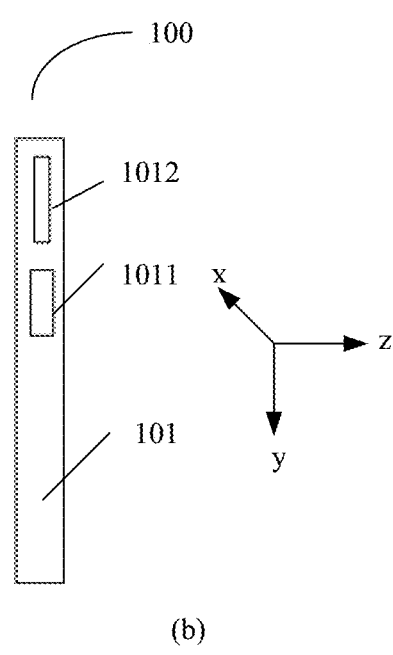

FIG. 1(a) is a schematic structural diagram of a partial area of an electronic device according to an embodiment of this application. FIG. 1(b) is a schematic structural diagram of a middle frame on a yz plane according to an embodiment of this application. Referring to FIG. 1, the electronic device includes a middle frame 101, a function button 102 (such as a volume button or a power button), and a lateral fingerprint recognition apparatus 130. Optionally, the electronic device further includes a screen 103. A side surface of the middle frame 101 is provided with a fingerprint hole 1011 and a function button hole 1012 (such as a volume button hole or a power button hole). The function button 102 is mounted on the middle frame 101 through the function button hole 1012, and the lateral fingerprint recognition apparatus 130 is mounted on the middle frame 101 through the fingerprint hole 1011.

For ease of description, coordinate systems of the accompanying drawings in the embodiments of this application are first described. Every two of the x, y, and z directions are perpendicular to each other. The z direction can be understood as a thickness direction of the middle frame (or the electronic device), the y direction can be understood as a width direction of the middle frame (or the electronic device), and the x direction can be understood as a length direction of the middle frame (or the electronic device). Alternatively, the y direction can be understood as a length direction of the middle frame (or the electronic device), and the x direction can be understood as a width direction of the middle frame (or the electronic device). For example, in this embodiment of this application, an example in which the y direction is the length direction of the middle frame, and the x direction is the width direction of the middle frame is used to describe the structure of the electronic device.

As described in the BACKGROUND section, in this embodiment of this application, arranging a fingerprint recognition apparatus on the side of the electronic device leads to too many buttons on the side, affecting the conciseness and beauty of the electronic device, and affecting user experience.

Based on this, according to this embodiment of this application, the lateral fingerprint recognition apparatus and the function button such as the volume button or the power button are combined into a whole, that is, the user can press the lateral fingerprint recognition apparatus to implement the functions of both fingerprint recognition and the function button. It can be understood that, to enable the lateral fingerprint recognition apparatus to have both the fingerprint recognition function and the function of the function button, it is necessary to make the lateral fingerprint recognition apparatus have a displacement amount when pressed, and the displacement amount can make the function button be pressed, thereby implementing the function of the function button.

For ease of description, the lateral fingerprint recognition apparatus is collectively described as a fingerprint recognition apparatus. Unless otherwise specified, the fingerprint recognition apparatus described below is a lateral fingerprint recognition apparatus.

To ensure the overall strength of the electronic device, according to this embodiment of this application, the fingerprint recognition apparatus can be assembled on the electronic device in an outside-in assembly manner, that is, the fingerprint recognition apparatus is placed inside the middle frame from the outside of the middle frame through the fingerprint hole arranged on the side surface of the middle frame, so as to assemble the fingerprint recognition apparatus. In this assembly manner, only the space to be occupied by the fingerprint recognition apparatus needs to be cut on the middle frame, thereby ensuring the overall strength of the electronic device as far as possible. In this assembly manner, because the fingerprint recognition apparatus is assembled from the outside of the middle frame to the inside, if the fingerprint recognition apparatus is not properly restricted and fixed on the electronic device, any external force may cause the fingerprint recognition apparatus to be displaced from the originally designed position, making it impossible to achieve the purpose of combining the fingerprint recognition apparatus and the function button into a whole, and seriously affecting the reliability of the electronic device.

Therefore, in consideration of combining the lateral fingerprint recognition apparatus and the function button into a whole, and assembling the fingerprint recognition apparatus from the outside to the inside, an embodiment of this application further provides a structure for restricting the lateral fingerprint recognition apparatus on the electronic device: the fingerprint recognition apparatus is in contact with the function button, a stopping assembly is arranged in the electronic device, and an accommodating structure is arranged in the fingerprint recognition apparatus. Through the cooperation between the stopping assembly and the accommodating structure, the fingerprint recognition apparatus can move in the limited space of the accommodating structure when pressed, so as to limit the displacement amount of the fingerprint recognition apparatus within a specific range, implementing the functions of the fingerprint recognition apparatus and of the function button, and preventing the fingerprint recognition apparatus from being displaced from the originally designed position (for example, the fingerprint recognition apparatus moves toward the outside of a fingerprint hole by an excessive displacement). Thus, the fingerprint recognition apparatus can be well secured onto the electronic device.

Figure 14:
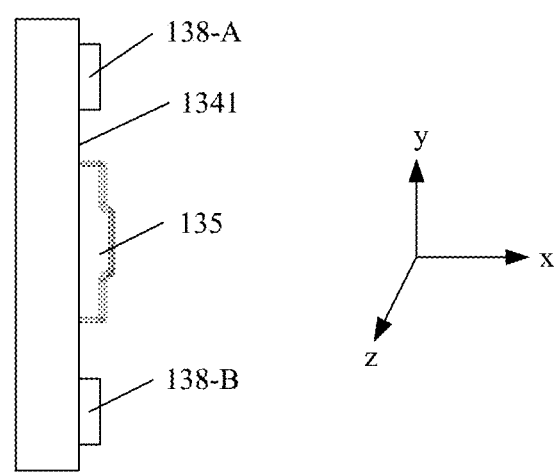
FIG. 14 is a schematic diagram of a structure of cooperation among a reinforcement component, a protruding component, and an elastic member on an xy plane according to an embodiment of this application.

The following describes in detail the electronic device in this embodiment of this application with reference to FIG. 1 and FIG. 14.

Figure 3:
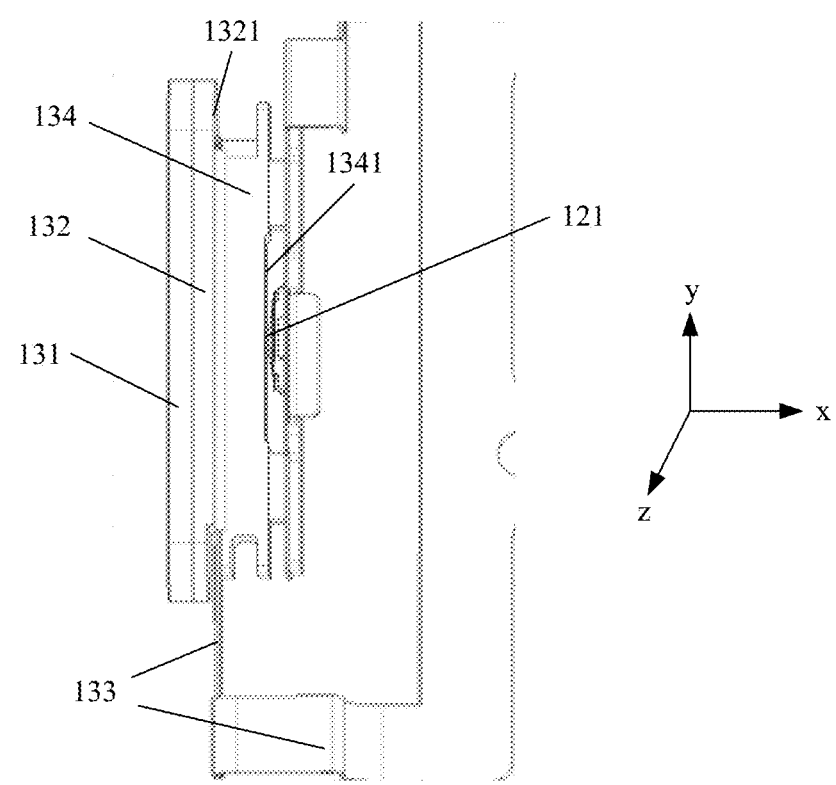
FIG. 3 is a cross-sectional view of a partial area of an electronic device on an xy plane according to an embodiment of this application.
Figure 4:
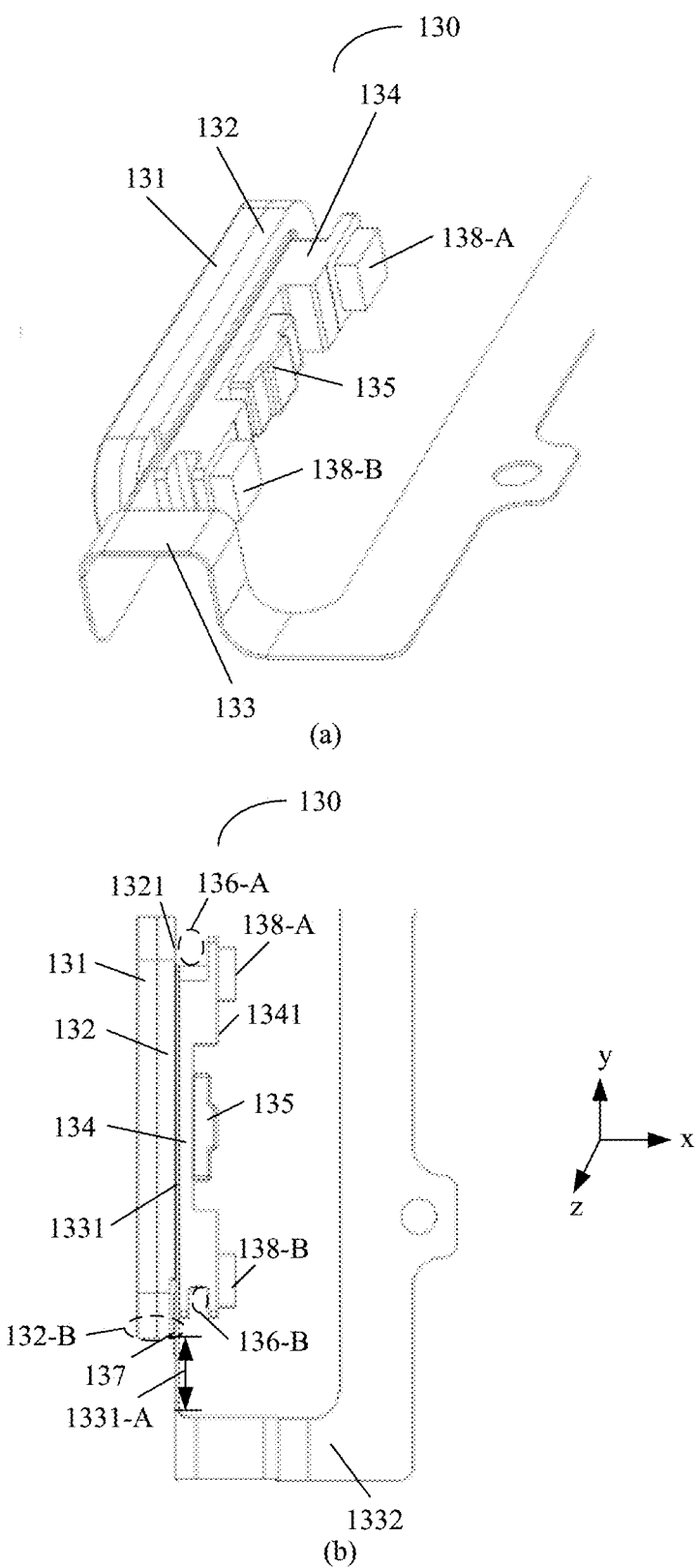
FIG. 4(a) is a three-dimensional schematic diagram of a fingerprint recognition apparatus according to an embodiment of this application.
FIG. 4(b) is a schematic diagram of a fingerprint recognition apparatus on an xy plane according to an embodiment of this application.

FIG. 2(a) and FIG. 2(b) are cross-sectional views of a partial area of an electronic device on an xy plane according to an embodiment of this application. FIG. 3 is a cross-sectional view of a partial area of an electronic device on an xy plane according to an embodiment of this application. FIG. 4 shows a fingerprint recognition apparatus according to an embodiment of the application. FIG. 4(a) is a three-dimensional schematic diagram of a fingerprint recognition apparatus according to an embodiment of this application. FIG. 4(b) is a schematic diagram of a fingerprint recognition apparatus on an xy plane according to an embodiment of this application. FIG. 5(a) is a three-dimensional schematic diagram of a stopping assembly according to an embodiment of this application. FIG. 5(b) is a schematic diagram of a stopping assembly on an xy plane according to an embodiment of this application. FIG. 6 is a three-dimensional schematic diagram of cooperation between a fingerprint recognition apparatus and a stopping assembly according to an embodiment of this application.

Figure 2:
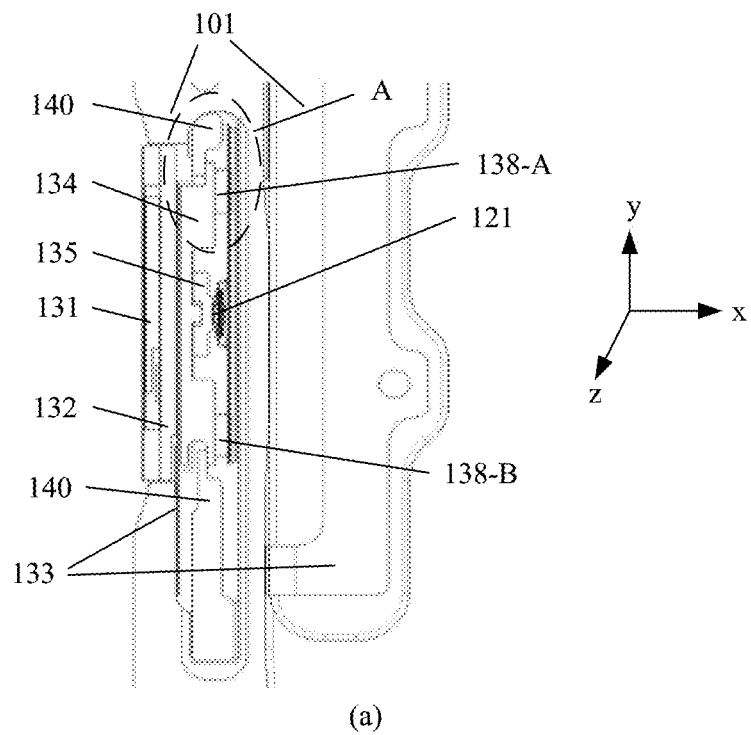
FIG. 2 is a cross-sectional view of a partial area of an electronic device on an xy plane according to an embodiment of this application.
Figure 2:
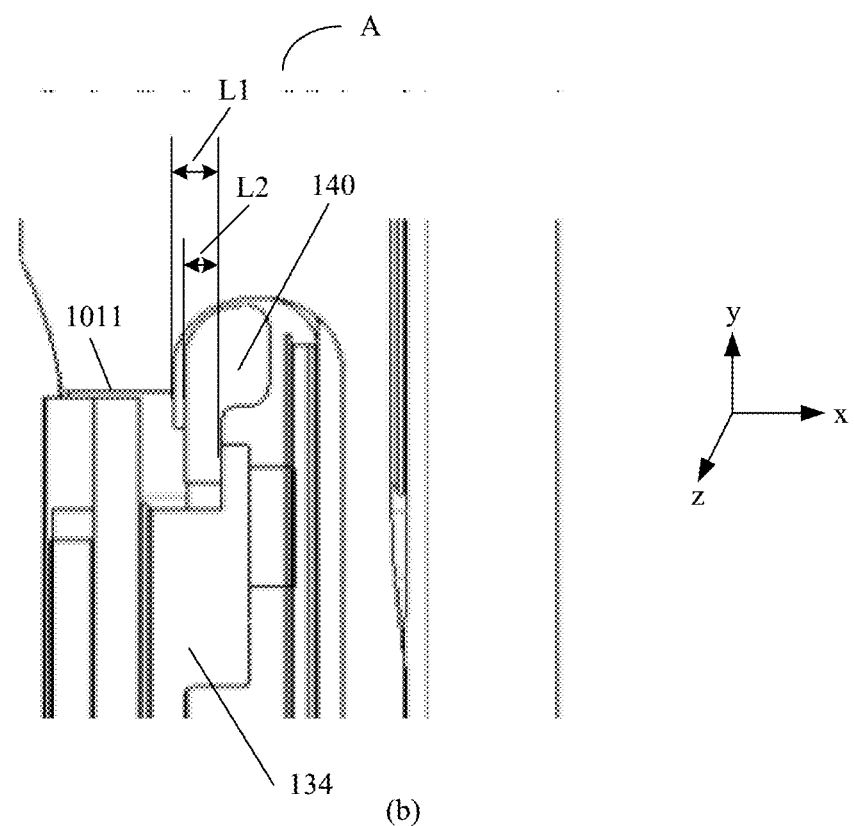

Referring to FIG. 1 and FIG. 2, the electronic device includes a middle frame 101, a fingerprint recognition apparatus 130, and a stopping assembly 140. A fingerprint hole 1011 is arranged on a side surface of the middle frame 101, and the fingerprint recognition apparatus 130 passes through the fingerprint hole 1011 with a small part exposed, helping the user press the fingerprint recognition apparatus 130. A first function button 121 (refer to FIG. 2) is fixedly connected to the middle frame 101. The fingerprint recognition apparatus 130 is in contact with the first function button 121. When the fingerprint recognition apparatus 130 is pressed, the fingerprint recognition apparatus 130 presses the first function button 121 to implement the fingerprint recognition function and the function of the first function button.

In this embodiment of this application, the side surface of the middle frame 101 may be a surface parallel to the yz plane or a surface parallel to the xz plane. For example, the structure of the electronic device is described by using an example in which the side surface of the middle frame 101 shown in FIG. 1 is a surface parallel to the yz plane.

It should be noted that the contact between the fingerprint recognition apparatus 130 and the first function button 121 described in this embodiment of this application can be understood as contact within an allowable range of a mounting error, and there may be a small gap caused by the mounting error. Similarly, the following explanation about describing the contact between two elements is the same as that described here, and details are not described again.

In some electronic devices, the position of the power button is closer to the position of the user's handheld device, for example, the power button is close to the thumb. In addition, the power button usually has only one button. Therefore, from the perspective of user experience and simple design, optionally, the first function button may be the power button.

The following describes in detail the fingerprint recognition apparatus 130 and the stopping assembly 140 with reference to FIG. 2 to FIG. 6.

Fingerprint Recognition Apparatus 130

For example, referring to FIG. 3, the fingerprint recognition apparatus 130 includes a fingerprint recognition assembly, a flexible circuit board 133, and a reinforcement component 134.

The fingerprint recognition assembly includes a fingerprint recognition chip 131 and a substrate 132. The fingerprint recognition assembly and the reinforcement component 134 are respectively attached to two opposite surfaces of the flexible circuit board 133, and the reinforcement component 134 is in contact with the first function button 121. An accommodating structure 136 is arranged between a surface 1341 of the reinforcement component 134 close to the first function button 121 and a surface 1321 of the fingerprint recognition assembly attached to the flexible circuit board 133.

For example, referring to FIG. 2 and FIG. 4, the fingerprint recognition apparatus 130 includes a fingerprint recognition assembly, a flexible circuit board 133, a reinforcement component 134, and a protruding component 135. The fingerprint recognition assembly includes a fingerprint recognition chip 131 and a substrate 132. The fingerprint recognition assembly and the reinforcement component 134 are respectively attached to two opposite surfaces of the flexible circuit board 133. The protruding component 135 is arranged on a surface 1341 of the reinforcement component 134 close to the first function button 121. The protruding component 135 is in contact with the first function button 121. An accommodating structure 136 is arranged between the surface 1341 of the reinforcement component 134 close to the first function button 121 and a surface 1321 of the fingerprint recognition assembly attached to the flexible circuit board 133.

In other words, unlike the fingerprint recognition apparatus shown in FIG. 3, the fingerprint recognition apparatus shown in FIG. 2 and FIG. 4 further includes a protruding component 135 arranged on the reinforcement component 134, and the protruding component 135 is in contact with the first function button 121.

Optionally, the protruding component 135 is made of a non-metallic material. The non-metallic material may be a material that has softer surface hardness than metal and has weak elasticity, such as plastic, rubber, or TPU, so that the function button is not easily damaged when the protruding component presses the function button.

Optionally, the reinforcement component 134 is made of steel, so as to improve the strength of the fingerprint recognition apparatus 130.

It should be understood that arrangement of the accommodating structure 136 between the surface 1341 of the reinforcement component 134 and the surface 1321 of the fingerprint recognition assembly is only an example for description, and should not constitute a limitation on this embodiment of this application, provided that the accommodating structure is arranged at any possible position in the fingerprint recognition apparatus. For example, an accommodating structure 136 may alternatively be arranged between a surface of the substrate 132 attached to the fingerprint recognition chip 131 and the surface 1341 of the reinforcement component 134.

For ease of description, for example, the electronic device in this embodiment of this application is described in detail by using an example in which the fingerprint recognition apparatus includes a protruding component in remaining accompanying drawings. Naturally, when structures of components that are unrelated to the protruding component, the structures of these components may be applied to the structure of the fingerprint recognition apparatus that does not include the protruding component, and these structures are all within the protection scope of the embodiments of this application.

Optionally, to facilitate the assembly of the fingerprint recognition apparatus from the outside to the inside, a size of the reinforcement component 134 on the yz plane is smaller than a size of the fingerprint recognition assembly on the yz plane.

For example, referring to FIG. 4, the fingerprint recognition assembly includes a fingerprint recognition chip 131 and a substrate 132. The fingerprint recognition chip 131 is attached to the substrate 132. The flexible circuit board 133 includes two parts, which are respectively denoted as a first part 1331 and a second part 1332. The first part 1331 is arranged between the substrate 132 and the reinforcement component 134, and two opposite surfaces of the first part 1331 are respectively attached to the surface of the reinforcement component 134 and the surface of the substrate 132, so as to fixedly connect the substrate 132, the flexible circuit board 133, and the reinforcement component 134. The second part 1332 extends from an end of the first part 1331 to the inside of the middle frame 101 and is fixedly connected to the middle frame 101, so as to implement electrical connection of the fingerprint recognition apparatus 130. For example, the fingerprint recognition chip 131, the substrate 132, the flexible circuit board 133, and the reinforcement component 134 may be bonded together by using thermosetting glue or the like.

For example, referring to FIG. 2 and FIG. 4, the protruding component 135 is in contact with the first function button 121, so that when the fingerprint recognition apparatus 130 is pressed, the protruding component 135 presses the first function button 121, so as to trigger the first function button 121, and achieve a two-in-one effect of the function of the fingerprint recognition apparatus 130 and the function of the first function button 121. Referring to FIG. 4, an accommodating structure 136 is arranged between the surface 1341 of the reinforcement component 134 close to the first function button 121 and the surface 1321 of the substrate 132 (that is, the surface of the fingerprint recognition assembly attached to the flexible circuit board 133). The accommodating structure 136 includes an accommodating structure 136-A and an accommodating structure 136-B. The surface 1341 of the reinforcement component 134 is a surface facing the first function button 121, which may be, for example, a surface of any shape such as a plane or a curved surface. For example, as shown in FIG. 4, the surface 1341 is a stepped surface, two ends in the y direction are convex areas of the stepped surface, and the middle is a concave area of the stepped surface.

Stopping Assembly 140

For example, referring to FIG. 2 to FIG. 6, the stopping assembly 140 is arranged on a side of the fingerprint hole 1011 close to the first function button 121, and the stopping assembly 140 is fixedly connected to the middle frame 101, and includes a retaining wall structure 141. A partial area of the retaining wall structure 141 (for example, the partial area includes an area 141-A and an area 141-B) is inserted into the accommodating structure 136. In addition, in the first direction (that is, the x direction), a size of the partial area of the retaining wall structure 141 is smaller than a size of movement space, and the movement space includes space of the accommodating structure 136 on the side of the fingerprint hole 1011 close to the first function button 121. In the second direction (that is, the z direction) of the first plane (that is, the yz plane) and/or in the third direction (that is, the y direction) of the first plane, a size of the retaining wall structure 141 is larger than a size of the fingerprint hole 1011. The first direction is perpendicular to the side surface of the middle frame 101, the first plane is parallel to the side surface of the middle frame 101, the second direction is a thickness direction of the middle frame 101, and the third direction is perpendicular to the second direction.

Optionally, the stopping assembly 140 is made of steel, so as to improve the strength of the fingerprint recognition apparatus 130.

The size of the retaining wall structure 141 in they direction or the z direction can be understood as the maximum size of the retaining wall structure 141. The movement space may be entire space or partial space of the accommodating structure 136. If the surface of the accommodating structure 136 (for example, the surface 1321 of the substrate) close to the side surface of the middle frame 101 is located on the left side of the fingerprint hole 1011, the movement space is partial space of the accommodating structure 136. If the surface of the accommodating structure 136 close to the side surface of the middle frame 101 is located on the right side of the fingerprint hole 1011, the movement space is entire space of the accommodating structure 136.

Figure 5:
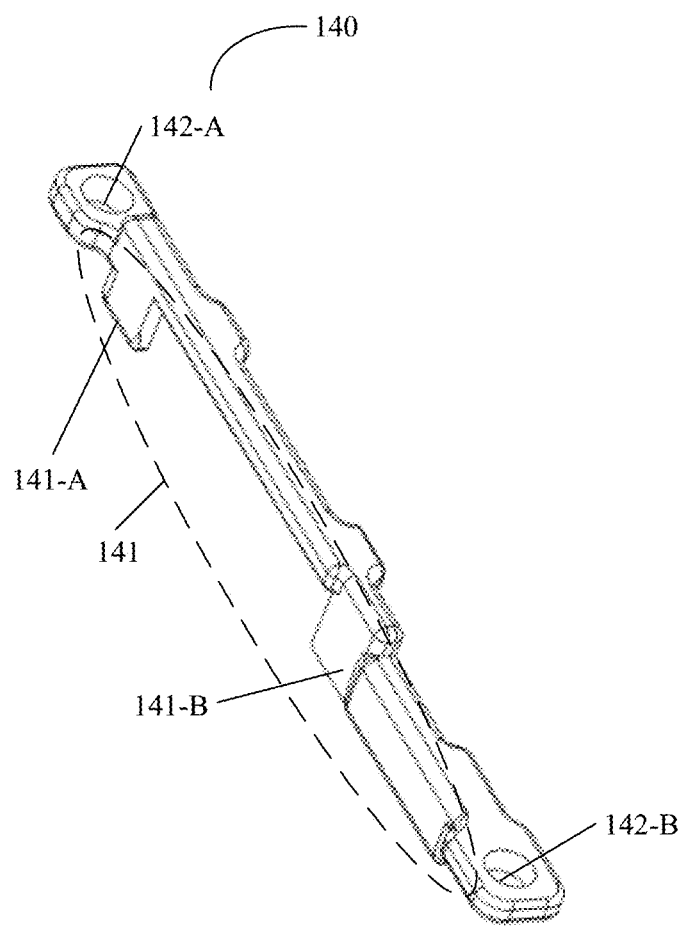
FIG. 5(a) is a three-dimensional schematic diagram of a stopping assembly according to an embodiment of this application.
FIG. 5(b) is a schematic diagram of a stopping assembly on an xy plane according to an embodiment of this application.
Figure 5:
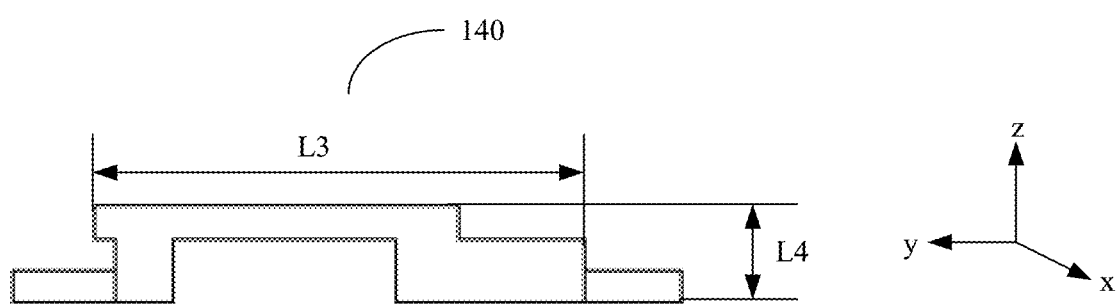
Figure 6:
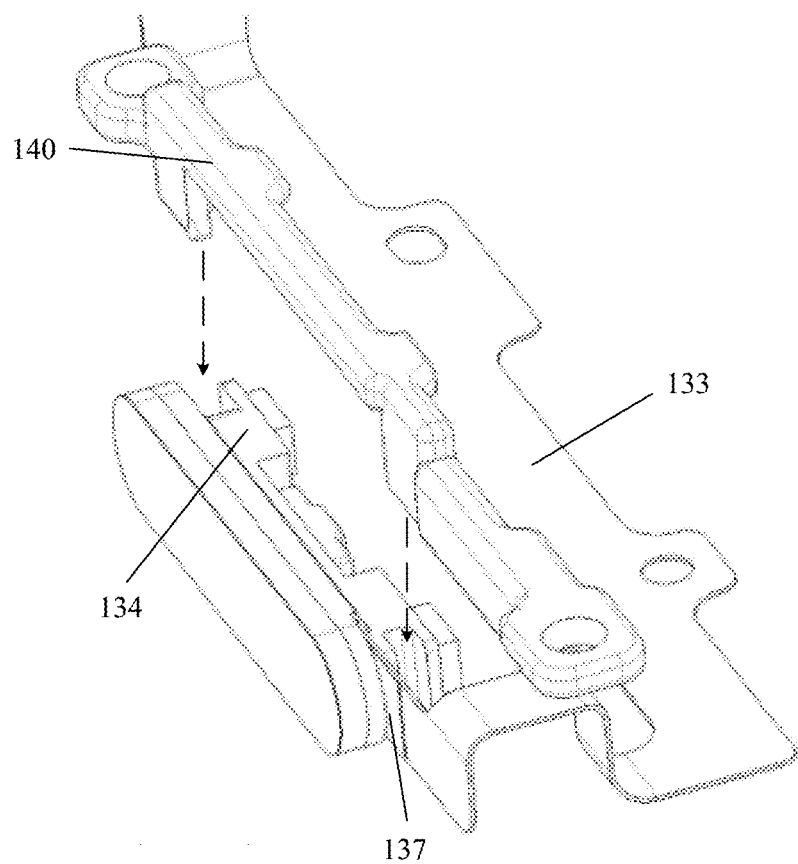
FIG. 6 is a three-dimensional schematic diagram of a structure of cooperation between a fingerprint recognition apparatus and a stopping assembly according to an embodiment of this application.

Specifically, for example, referring to FIG. 5 and FIG. 6, the stopping assembly 140 includes a retaining wall structure 141, a partial area of the retaining wall structure 141 includes an area 141-A and an area 141-B, and the area 141-A and the area 141-B are respectively inserted into the accommodating structure 136-A and the accommodating structure 136-B. To enable the fingerprint recognition apparatus 130 to have a displacement amount within a specific range and to have a good restriction effect, refer to FIG. 2(b). First, the stopping assembly 140 is arranged on a side of the fingerprint hole 1011 close to the first function button 121, that is, the stopping assembly 140 is arranged on the right side of the fingerprint hole 1011. Second, the sizes of the area 141-A and the area 141-B of the retaining wall structure 141 that are inserted into the accommodating structure 136 in the x direction are smaller than the size of the movement space in the x direction, for example, the size of the area 141-A in the x direction shown in FIG. 2(b) is L2, the size of the movement space in the x direction is L1, and L2 is smaller than L1, so that the fingerprint recognition apparatus 130 can move in the movement space. Third, referring to FIG. 2(b) and FIG. 5(b), the size L3 of the retaining wall structure 141 in the y direction is larger than the size of the fingerprint hole 1011 in the y direction, and/or the size L4 of the retaining wall structure 141 in the z direction is larger than the size of the fingerprint hole 1011 in the z direction, so that the reinforcement component 134 does not move toward the left side of the fingerprint hole 1011, so as to restrict the range of movement of the fingerprint recognition apparatus 130 from inside to outside.

It should be understood that the structure of each component in the electronic device and the connection relationship between the components shown in FIG. 2 to FIG. 6 are only examples for description, and structures of any replaceable components that have the same functions as the foregoing components are all within the protection scope of the embodiments of this application. The following describes in detail the related structure of each component.

According to the electronic device provided in this embodiment of this application, the stopping assembly located on the side of the fingerprint hole close to the function button is arranged in the electronic device, the accommodating structure is arranged in the fingerprint recognition apparatus, and the partial area of the retaining wall structure of the stopping assembly is inserted into the accommodating structure. In the movement space formed by the space of the accommodating structure on the side of the fingerprint hole close to the first function button, in the direction perpendicular to the side surface of the middle frame, the size of the movement space is larger than the size of the partial area of the retaining wall structure inserted into the accommodating structure. In addition, in the thickness direction of the middle frame and/or in the direction perpendicular to the thickness direction of the middle frame and parallel to the side surface of the middle frame, the size of the retaining wall structure is larger than the size of the fingerprint hole. This can ensure that the fingerprint recognition apparatus moves only in the movement space of the accommodating structure under the action of external force, so as to limit the displacement amount of the fingerprint recognition apparatus within a specific range, implementing the functions of the fingerprint recognition apparatus and of the function button, and preventing the fingerprint recognition apparatus from being displaced from the originally designed position (for example, the fingerprint recognition apparatus moves toward the outside of a fingerprint hole by an excessive displacement). Thus, the fingerprint recognition apparatus can be well secured onto the electronic device.

In this embodiment of this application, when the accommodating structure 136 is arranged in any area between the surface 1321 of the substrate 132 and the surface 1341 of the reinforcement component 134, the specific form of the accommodating structure 136 is related to the specific structure of the reinforcement component 134. The following describes in detail the reinforcement component 134 and the accommodating structure 136 in this embodiment of this application with reference to FIG. 7 to FIG. 9.

Figure 7:
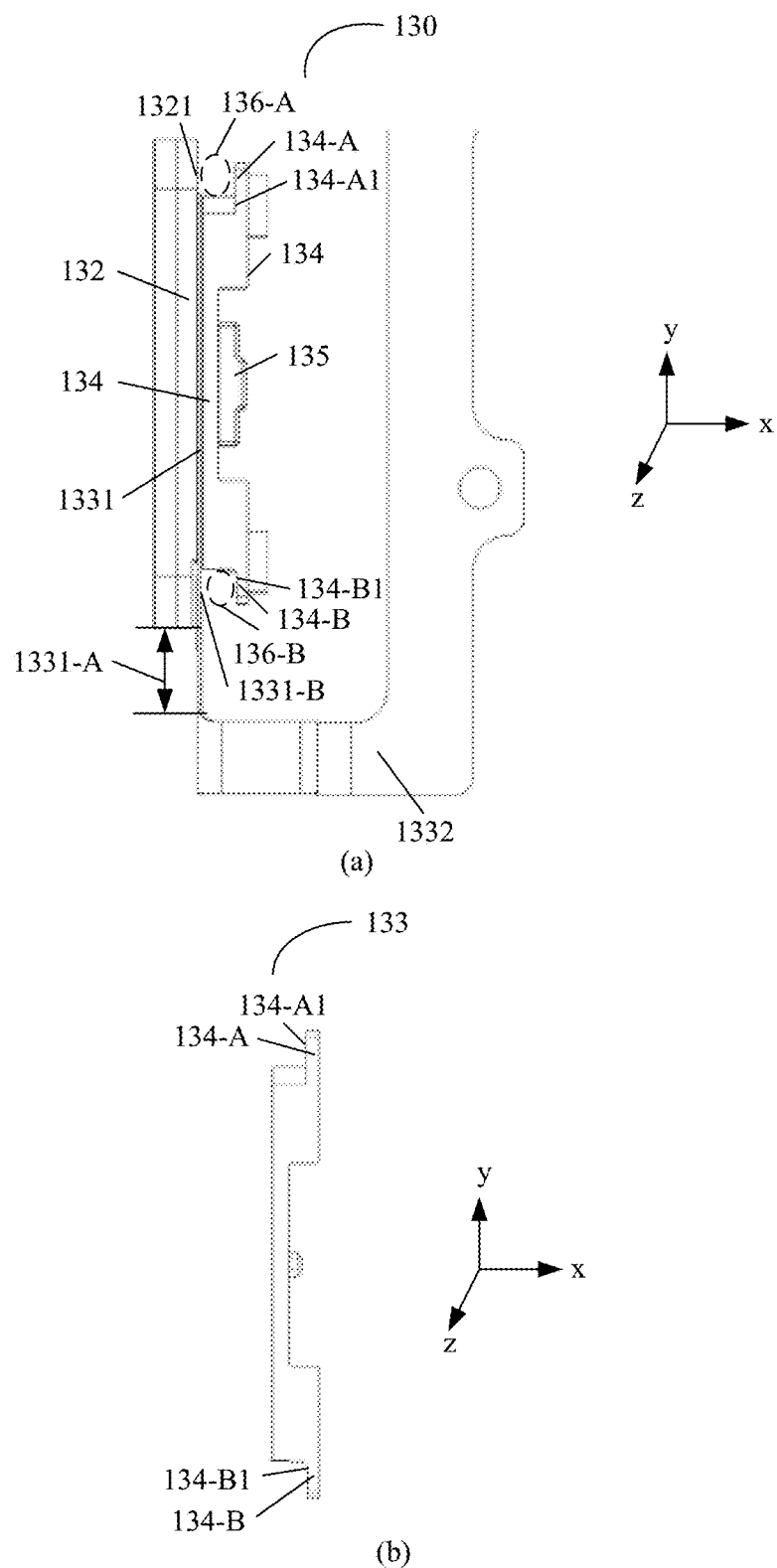
FIG. 7(a) is a cross-sectional view of a fingerprint recognition apparatus on an xy plane according to an embodiment of this application.
FIG. 7(b) is a schematic diagram of a reinforcement component on an xy plane according to an embodiment of this application.

FIG. 7(*a*) is a cross-sectional view of a fingerprint recognition apparatus on an xy plane according to an embodiment of this application. FIG. 7(*b*) is a schematic diagram of a reinforcement component on an xy plane according to an embodiment of this application.

Optionally, referring to FIG. 7, each of the two ends of the reinforcement component 134 is formed as a claw-shaped structure (a claw-shaped structure 134-A and a claw-shaped structure 134-B) extending outward, and an accommodating structure 136 is arranged between a surface of each claw-shaped structure facing away from the first function button 121 and the surface of the fingerprint recognition assembly attached to the flexible circuit board 133.

In the reinforcement component shown in FIG. 7, an accommodating structure 136 is arranged between the inner surface of each claw-shaped structure and the surface 1321 of the substrate. Specifically, an accommodating structure 136-A is formed in an area between a surface 134-A1 of the claw-shaped structure 134-A and the surface 1321 of the substrate 132, and an accommodating structure 136-B is formed in an area between a surface 134-B1 of the claw-shaped structure 134-B and a surface 1331-B of the first part 1331 of the flexible circuit board 133 close to the reinforcement component 134.

Figure 8:
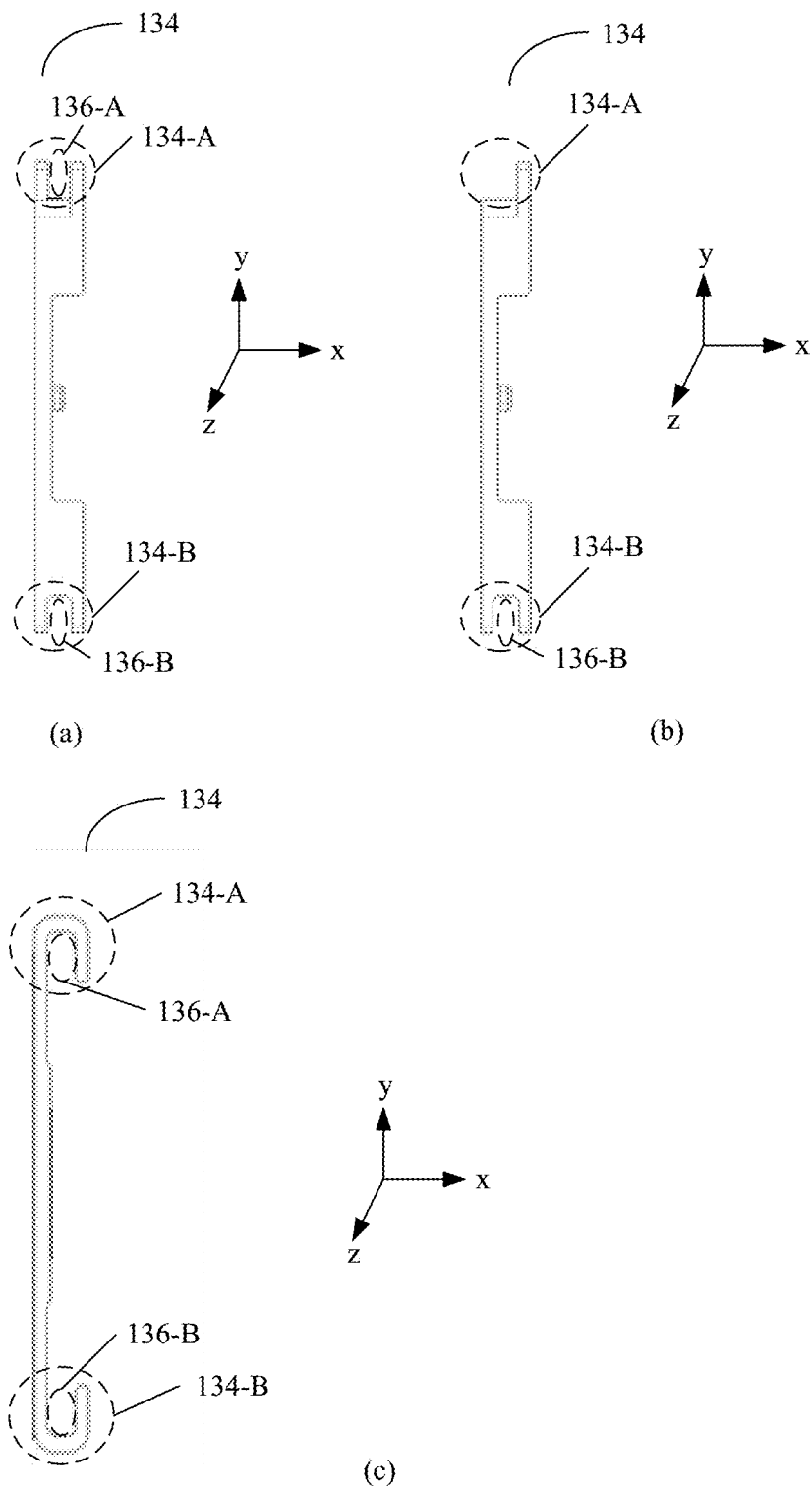
FIG. 8 and FIG. 9 are schematic diagrams of a reinforcement component on an xy plane according to an embodiment of this application.
Figure 9:
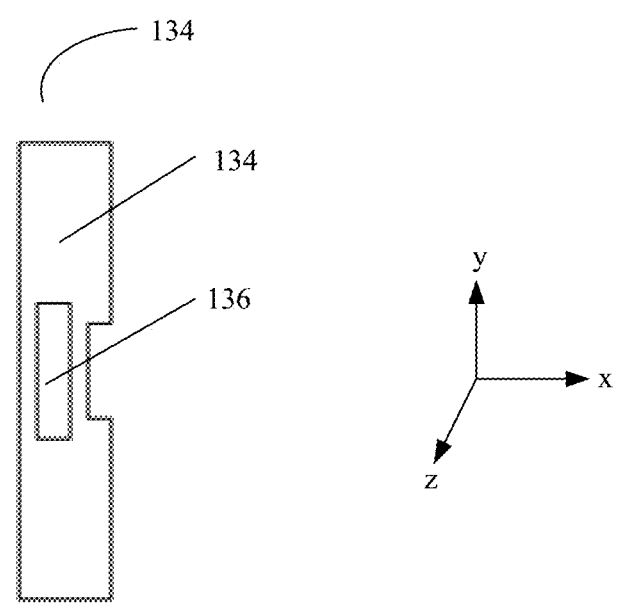

Optionally, referring to FIG. 8, at least one end of the reinforcement component 134 is formed as a U-shaped structure (an end 134-A and an end 134-B), and the accommodating structure 136 includes space formed by the U-shaped structure.

For example, in the reinforcement component shown in FIG. 8(*a*), both ends of the reinforcement component 134 are formed as a U-shaped structure, and an opening of the U-shaped structure faces outward, that is, two edges of the U-shaped structure extend outward in the y direction.

For another example, in the reinforcement component shown in FIG. 8(*b*), one end of the reinforcement component 134 is formed as a U-shaped structure, and an opening of the U-shaped structure faces outward.

For another example, in the reinforcement component shown in FIG. 8(*c*), both ends of the reinforcement component 134 are formed as a U-shaped structure, and an opening of the U-shaped structure faces inward.

It should be understood that the foregoing reinforcement components and accommodating structures shown in FIG. 7 and FIG. 8 are examples for description, and should not constitute a limitation on this embodiment of this application. Any possible variant structure is within the protection scope of the embodiments of this application, provided that an accommodating structure can be formed between the reinforcement component and the substrate. For example, referring to FIG. 9, at least one groove or hole may be directly arranged on the reinforcement component 134. The groove or hole is formed as the accommodating structure 136. Correspondingly, an area to be inserted into the corresponding accommodating structure 136 is arranged on the stopping assembly 140.

In this embodiment of this application, the second part of the flexible circuit board is fixed to the middle frame, and the first part is separately attached to the fingerprint recognition assembly and the reinforcement component. The fingerprint recognition apparatus has a specific displacement amount under the action of external force under daily use conditions. This design of the flexible circuit board may cause the first part of the flexible circuit board to be deformed under the action of external force. Especially when the end area of the fingerprint recognition apparatus close to the second part is repeatedly clicked or pressed, such deformation may be more serious, causing the flexible circuit board to be fatigued and fractured. This seriously reduces the durability and reliability of the flexible circuit board, and affects the reliability of the electronic device.

Therefore, to increase the durability and reliability of the flexible circuit board, the flexible circuit board has been improved in this embodiment of this application. Optionally, referring to FIG. 4, the flexible circuit board 133 includes a first part 1331 and a second part 1332. The first part 1331 is arranged between the fingerprint recognition assembly and the reinforcement component 134. The first part 1331 includes an extension area 1331-A stretching out of the first end 132-B of the fingerprint recognition assembly. The second part 1332 extends from the end of the extension area 1331-A to the inside of the middle frame 101 and is fixedly connected to the middle frame 101.

In other words, in the y direction, there is a specific length of distance between the end of the extension area 1331-A and the first end 132-B of the fingerprint recognition assembly. The extension area 1331-A of the first part 1331 can be understood as a free movement area of the flexible circuit board 133, or can be understood as a redundant length of the first part 1331. For example, the length of the extension area 1331-A in the y direction may be determined based on the displacement amount of the fingerprint recognition apparatus 130 in the x direction.

Figure 10:
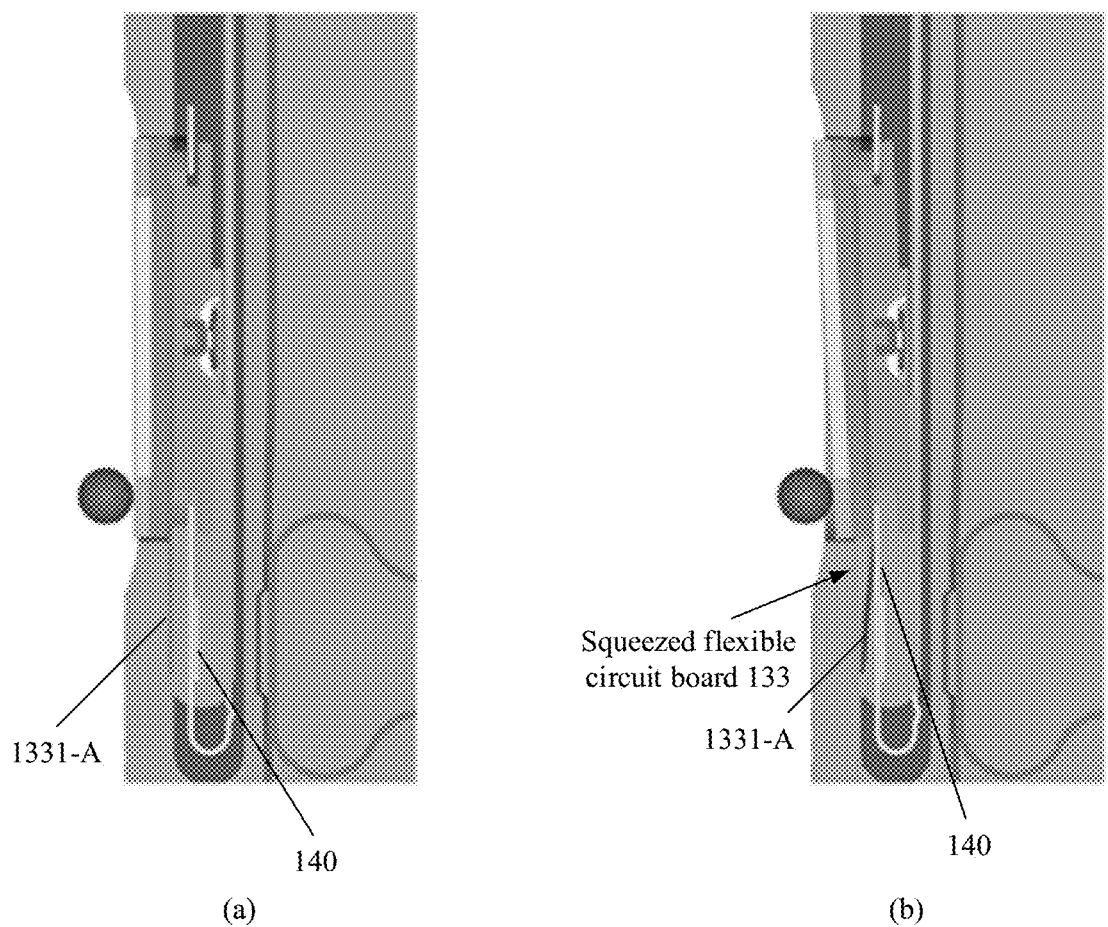
FIG. 10(a) is a schematic diagram of a state of a flexible circuit board when a fingerprint recognition apparatus is not clicked or pressed according to an embodiment of this application.
FIG. 10(b) is a schematic diagram of a state of a flexible circuit board when a fingerprint recognition apparatus is clicked or pressed according to an embodiment of this application.

FIG. 10(*a*) is a schematic diagram of a state of a flexible circuit board when a fingerprint recognition apparatus is not clicked or pressed according to an embodiment of this application. FIG. 10(*b*) is a schematic diagram of a state of a flexible circuit board when a fingerprint recognition apparatus is clicked or pressed according to an embodiment of this application. It can be seen that when the lower end of the fingerprint recognition apparatus 130 is clicked or pressed, the redundant length of the extension area 1331-A can make the first part 1331 of the flexible circuit board 133 have a larger swing radius, thereby reducing the possibility of deformation of the first part 1331, and thus increasing the service life of the flexible circuit board 133.

Therefore, according to the electronic device provided in this embodiment of this application, an extension area stretching out of the end (for example, the first end) of the fingerprint recognition apparatus is added to the first part of the flexible circuit board, and the extension area can make the first part of the flexible circuit board have a specific redundant length. When the fingerprint recognition apparatus is repeatedly clicked or pressed, the first part of the flexible circuit board has a larger swing radius with the movement of the fingerprint recognition apparatus, so as to reduce deformation of the first part, thereby reducing possibility of fatigue fracture of the flexible circuit board, and increasing a service life of the flexible circuit board.

In the structure in which the first part of the flexible circuit board has an extension area, there may be another problem. Based on this, related improvements have been made in the embodiments of this application. The following describes in detail the embodiments of this application from the following four aspects.

First Aspect

Referring to FIG. 7, in the structure in which the first part 1331 of the flexible circuit board 133 has an extension area 1331-A, the accommodating structure 136-B is formed in the area between the claw-shaped structure 134-B and the surface 1331-B of the first part 1331 of the flexible circuit board 133. When the lower end of the fingerprint recognition apparatus 130 is repeatedly clicked or pressed, the fingerprint recognition apparatus 130 moves toward the first function button 121, and the first part 1331 of the flexible circuit board 133 moves in the direction close to the first function button 121 with the fingerprint recognition apparatus 130, so that an exposed area of the first part 1331 that is close to the reinforcement component 134 but is not attached to the reinforcement component 134 (for example, the exposed area includes the extension area 1331-A) is getting closer to the stopping assembly 140, and may be in repeated contact with the stopping assembly 140. Consequently, repeated contact and friction between the stopping assembly 140 with good rigidity and the flexible circuit board 133 which is easy to deform may damage the flexible circuit board 133.

Therefore, to protect the flexible circuit board, optionally, referring to FIG. 2, FIG. 4, and FIG. 8(*b*), the end (the end 134-B) of the reinforcement component 134 close to the first end 132-B of the fingerprint recognition assembly is formed as a U-shaped structure. Two edges of the U-shaped structure extend outward in the third direction (that is, the y direction). The accommodating structure 136 includes space formed by the U-shaped structure.

Further referring to FIG. 10(*b*), it can be seen that when the lower end of the fingerprint recognition apparatus is repeatedly clicked or pressed, the extension area 1331-A is getting closer to the stopping assembly 140. The end is arranged as the U-shaped structure, and the edge of the U-shaped structure close to the flexible circuit board 133 is equivalent to adding a protective layer between the stopping assembly 140 and the first part 1331 of the flexible circuit board 133, thereby reducing the possibility that the exposed area of the first part 1331 of the flexible circuit board 133 attached to the reinforcement component 134 is in contact with the stopping assembly 140, and thus protecting the flexible circuit board 133. It should be noted that although the edge of the U-shaped structure has good rigidity, because the area of the first part of the flexible circuit board close to the first end of the fingerprint recognition assembly is separately attached to the fingerprint recognition assembly and the U-shaped structure, which can be regarded as whole movement during the movement, the flexible circuit board is not damaged to a great extent.

Therefore, according to the electronic device provided in this embodiment of this application, the end of the reinforcement component close to the first end of the fingerprint recognition assembly is arranged as the U-shaped structure, and the edge of the U-shaped structure close to the flexible circuit board is equivalent to adding a protective layer between the stopping assembly and the first part of the flexible circuit board, thereby reducing the possibility that the exposed area of the first part of the flexible circuit board that is close to the reinforcement component but is not attached to the reinforcement component is in contact with the stopping assembly, and thus protecting the flexible circuit board.

Second Aspect

When the end of the extension area 1331-A of the fingerprint recognition apparatus 130 away from the first part 1331 of the flexible circuit board 133 is repeatedly clicked or pressed, the other end of the fingerprint recognition apparatus 130 tilts away from the first function button 121, that is, tilts toward the direction close to the fingerprint hole 1011. This may squeeze the extension area 1331-A out of the fingerprint hole 1011 for a little bit, causing back-and-forth rubbing between the extension area 1331-A and the edge of the fingerprint hole 1011, and shortening the service life of the flexible circuit board 130.

Figure 11:
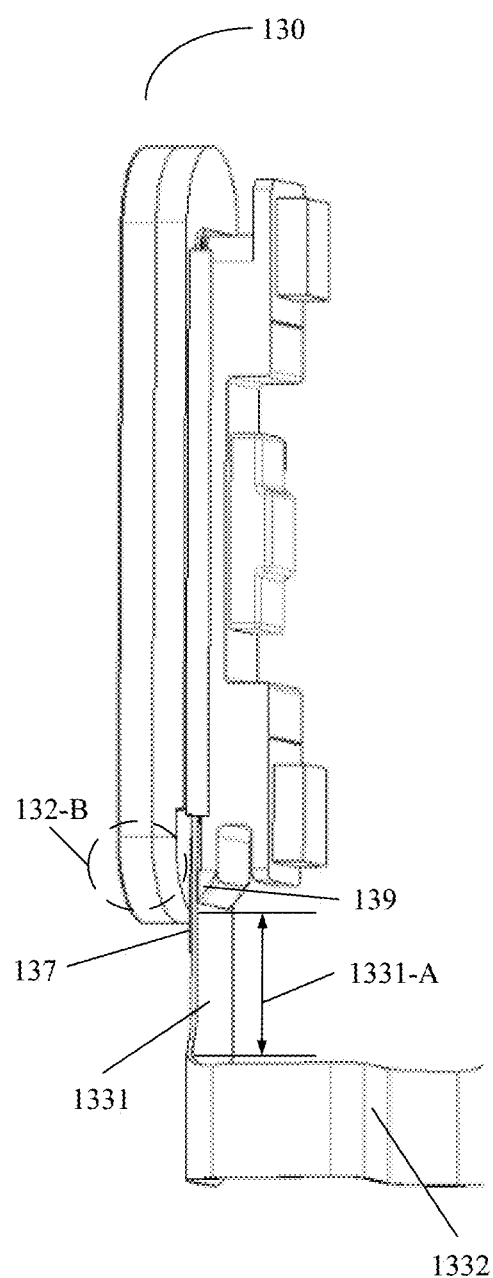
FIG. 11 is a three-dimensional schematic diagram of a fingerprint recognition apparatus according to an embodiment of this application.

Therefore, to increase the service life of the flexible circuit board, optionally, referring to FIG. 4(*b*) and FIG. 11, a protective film 137 is attached to a first area on a surface close to the first part 1331 of the fingerprint recognition assembly. The first area is close to the first end 132-B of the fingerprint recognition assembly.

The surface close to the first part 1331 of the fingerprint recognition assembly can be understood as the outer surface of the first part 1331, which is a surface attached to the fingerprint recognition assembly. The protective film 137 is attached to the area on the surface close to the first end 132-B of the fingerprint recognition assembly.

Therefore, at a position close to the first end of the fingerprint recognition assembly, the protective film is attached to the surface of the first part of the flexible circuit board close to the fingerprint recognition assembly. This can prevent the flexible circuit board from rubbing against an edge of the fingerprint hole in an area close to the first end of the fingerprint recognition assembly during movement, thereby increasing the service life of the flexible circuit board.

Third Aspect

Due to the existence of the extension area 1331-A of the flexible circuit board 133, the extension area 1331-A is in repeated contact with the end of the reinforcement component 134 during the swing. The repeated contact between the flexible circuit board 133 made of soft material and the reinforcement component with good rigidity damages the flexible circuit board.

Therefore, optionally, referring to FIG. 11, glue dispensing processing may be performed at a position close to the end of the extension region 1331-A of the reinforcement component 134 and the end of the reinforcement component 134, so as to form a buffer component 139 at the end of the reinforcement component 134, thereby reducing damage to the reinforcement component and the flexible circuit board.

Fourth Aspect

The flexible circuit board 133 is attached to the substrate 132 in the fingerprint recognition assembly through an adhesive layer. To improve the waterproof performance, it is necessary to reserve a glue dispensing area for waterproofing on the flexible circuit board 133, and glue dispensing processing is performed in the glue dispensing area. Due to existence of the extension area 1331-A of the flexible circuit board 133, it is impossible to reserve a glue dispensing area on the short edge parallel to the x direction in the extension area 1331-A of the flexible circuit board 133. Therefore, an embodiment of this application provides the following glue dispensing manner.

Figure 12:
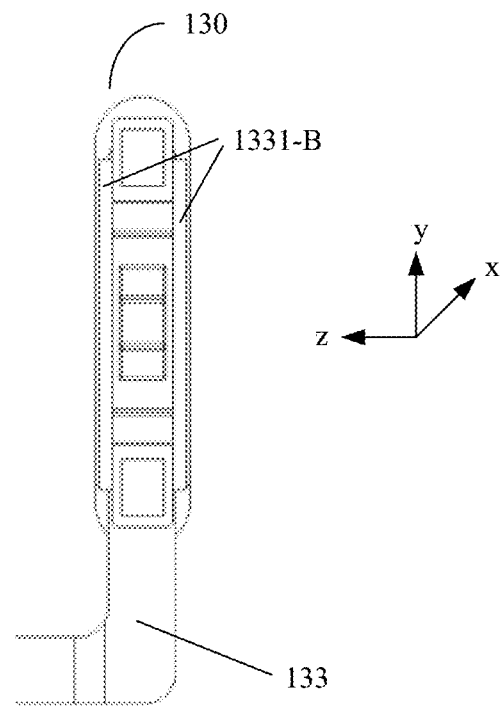
FIG. 12(a) is a schematic diagram of a fingerprint recognition apparatus on a yz plane according to an embodiment of this application.
FIG. 12(b) is a schematic diagram of a fingerprint recognition apparatus on an xy plane according to an embodiment of this application.
Figure 12:
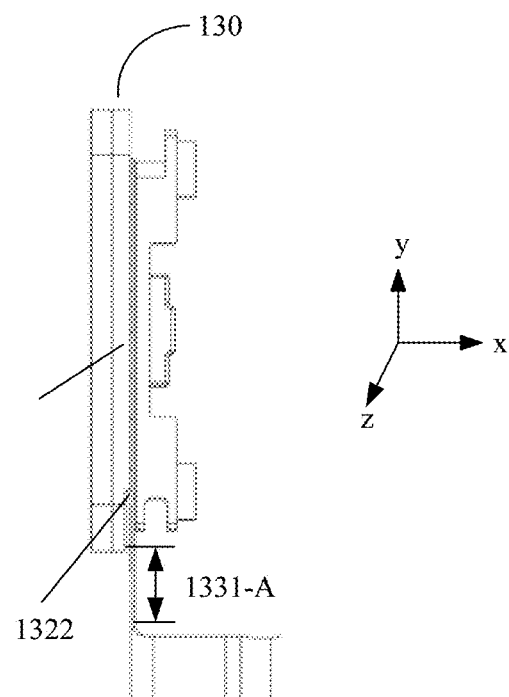

Optionally, referring to FIG. 12(*a*), a glue dispensing area 1331-B is reserved on the edges on both sides of the flexible circuit board 133 parallel to the y direction, and glue dispensing is performed on the glue dispensing area 1331-B. Using the capillary phenomenon allows the glue to fully infiltrate between the flexible circuit board 133 and the substrate 132, thereby implementing waterproofing between the flexible circuit board 133 and the substrate 132.

To enable the glue to better infiltrate to the short edge, optionally, referring to FIG. 12(*b*), the end of the substrate 132 close to the extension area 1331-A may be provided with a glue storage notch 1322 with a specific depth in the x direction.

In this embodiment of this application, a protruding component 135 is arranged on the reinforcement component 134 of the fingerprint recognition apparatus 130, and the protruding component 135 is in contact with the first function button 121. Due to the design of contact between the protruding component 135 and the first function button 121, there is a gap between the reinforcement component 134 and the middle frame 101 provided with the first function button 121. When one end of the fingerprint recognition apparatus 130 is clicked or pressed, the single-side uplifting problem is likely to occur, forming a seesaw structure, and reducing the stability of the fingerprint recognition apparatus 130. Therefore, to improve the stability of the fingerprint recognition apparatus 130, this embodiment of this application provides three possible structures. The following describes in detail these three structures with reference to FIG. 2, and FIG. 13 to FIG. 15.

First Structure

Figure 13:
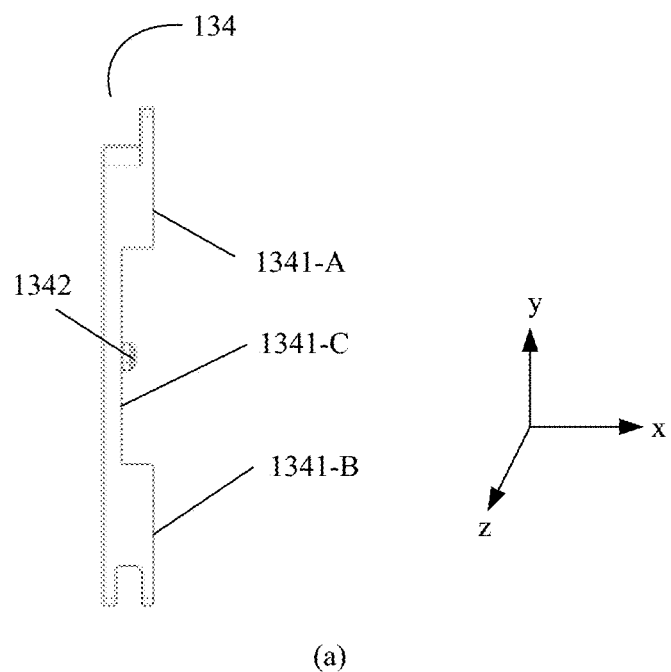
FIG. 13(a) is a schematic diagram of a reinforcement component on an xy plane according to an embodiment of this application.
FIG. 13(b) is a schematic diagram of a structure of cooperation among a reinforcement component, a protruding component, and an elastic member on an xy plane according to an embodiment of this application.
Figure 13:
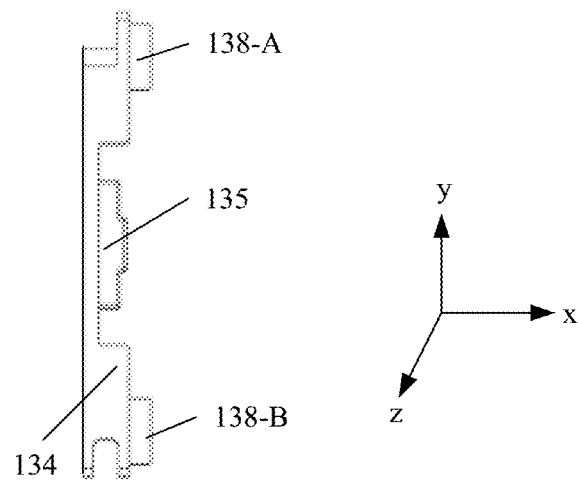

Optionally, referring to FIG. 13, the surface 1341 of the reinforcement component 134 facing the first function button 121 is a stepped surface, and the stepped surface includes a concave area and a convex area, and a protruding component 135 is arranged on the concave area. In FIG. 13, the concave area includes 1341-C, and the convex area includes 1341-A and 1341-B.

Therefore, the surface of the reinforcement component facing the function button is arranged as a stepped surface having a concave area and a convex area, and the protruding component is arranged on the concave area. This can combine the fingerprint recognition apparatus and the function button into a whole, thereby reducing the gap between the reinforcement component and the middle frame provided with the function button, and improving the stability of the fingerprint recognition apparatus when one end of the fingerprint recognition apparatus is clicked or pressed.

For example, the concave area on the surface 1341 of the reinforcement component 134 may not be provided with the protruding component 135, and the concave area is in contact with the first function button 121. This can combine the fingerprint recognition apparatus and the function button into a whole, thereby reducing the gap between the reinforcement component and the middle frame provided with the function button, and improving the stability of the fingerprint recognition apparatus when one end of the fingerprint recognition apparatus is clicked or pressed.

It should be understood that the structure of the reinforcement component shown in FIG. 13 is only an example for description, and should not constitute a limitation on this embodiment of this application. Any structure of the reinforcement component that can meet the foregoing conditions is within the protection scope of this embodiment of this application.

Second Structure

The second structure may be designed in combination with the first structure, or may be designed separately. The following describes the second structure by using the combined design of the two structures as an example.

Optionally, referring to FIG. 2 and FIG. 13, the surface 1341 of the reinforcement component 134 facing the first function button 121 includes a middle area 1341-C and two end areas (an end area 1341-A and an end area 1341-B), and the middle area 1341-C is provided with the protruding component 135 of the reinforcement component 134; and the fingerprint recognition apparatus 130 further includes an elastic member 138 arranged on each end area, and when any one end of the fingerprint recognition apparatus 130 is pressed, the elastic member 138 arranged on the end is in tight contact with the middle frame 101.

The end area 1341-A is provided with an elastic member 138-A, and the end area 1341-B is provided with an elastic member 138-B.

For example, the middle area on the surface 1341 of the reinforcement component 134 may not be provided with the protruding component 135, and the middle area is in contact with the first function button 121.

It should be understood that, in the process of combined design of the first structure and the second structure, for example, the middle area on the surface 1341 of the reinforcement component may be used as a concave area, and the end area may be used as a convex area.

In this structure, elastic members are arranged at both ends of the reinforcement component. This fills a gap between the reinforcement component and the middle frame. In addition, because the elastic member has good elasticity, when one end of the fingerprint recognition apparatus is clicked, the elastic member corresponding to the end is compressed and is in tight contact with the middle frame, well playing a restriction and support role. When the pressing is completed, the elastic member rebounds the fingerprint recognition apparatus, and the elastic member returns to an initial state of being flush with the middle frame. This can effectively avoid a single-side uplifting problem caused when one end of the fingerprint recognition apparatus is pressed, thereby improving stability of the fingerprint recognition apparatus.

Optionally, the elastic member may be made of foam.

It should be understood that the structure of the reinforcement component shown in FIG. 13 is only an example for description, and should not constitute a limitation on this embodiment of this application. Any structure of the reinforcement component that can meet the foregoing conditions is within the protection scope of this embodiment of this application. For example, the surface of the reinforcement component facing the first function button is not necessarily designed as a stepped surface, but may alternatively be a surface of any other structure, provided that an elastic member is arranged on the end area of the surface. For example, referring to FIG. 14, the surface 1341 of the reinforcement component 134 is a plane, and the two end areas are respectively provided with an elastic member 138-A and an elastic member 138-B. Naturally, the protruding component 135 may be arranged in the middle area.

Third Structure

Figure 15:
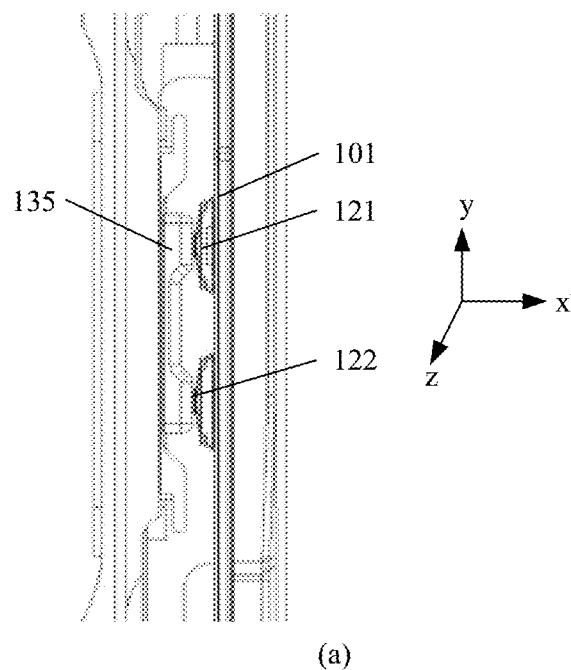
FIG. 15(a) is a cross-sectional view of a partial area of an electronic device having two function buttons on an xy plane according to an embodiment of this application.
FIG. 15(b) and FIG. 15(c) are schematic diagrams of a structure of cooperation between a reinforcement component and a protruding component on an xy plane according to an embodiment of this application.
Figure 15:
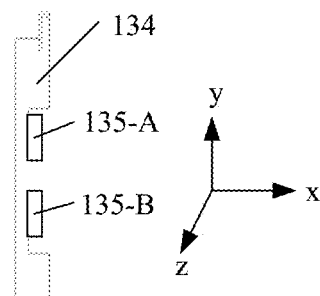
Figure 15:
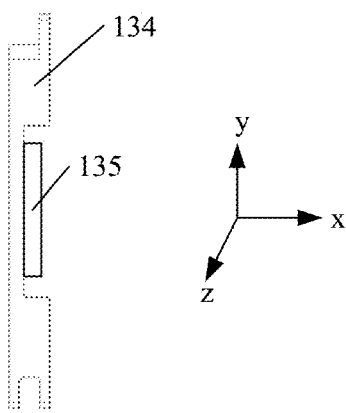

Optionally, referring to FIG. 15, the middle frame 101 is further provided with a second function button 122. The second function button 122 and the first function button 121 are distributed in the third direction (that is, the y direction), and the protruding component 135 is in contact with both the first function button 121 and the second function button 122.

For example, referring to FIG. 15(a), the protruding component 135 may be a double protruding structure, two ends of the protruding component of the double protruding structure are both formed as a protruding structure, each protruding structure corresponds to each function button, and each protruding structure is in contact with the corresponding function button. During design of the protruding component, it is recommended that the protruding component should be arranged in the middle area with a larger range of the reinforcement component, so that the two protruding structures of the protruding component are close to the ends of the reinforcement component as far as possible.

For example, referring to FIG. 15(b), the protruding component 135 may alternatively include a first protruding component 135-A and a second protruding component 135-B, each of which is in contact with a corresponding function button. During arrangement of the protruding component, it is recommended that two protruding components should be arranged in the area close to the end of the reinforcement component.

For example, referring to FIG. 15(c), the protruding component 135 may alternatively be one protruding component, and a surface of the protruding component facing the function button may be a plane, and each end of the surface is in contact with a corresponding function button. Optionally, the first function button 121 and the second function button 122 may be buttons that implement the same function, or may be buttons that implement different functions. For example, the first function button 121 is a power button, and the second function button 122 is a volume button. For another example, both the first function button 121 and the second function button 122 may be volume buttons; one button is a volume button for increasing the volume, and the other button is a volume button for decreasing the volume.

Therefore, two function buttons (for example, the first function button and the second function button) are arranged on the middle frame, and the two function buttons are both in contact with the protruding component arranged on the reinforcement component, so as to form a support structure with a span. This support structure has higher stability and can effectively avoid a single-side uplifting problem caused when one end of the fingerprint recognition apparatus is pressed, thereby improving stability of the fingerprint recognition apparatus.

For example, the surface 1341 of the reinforcement component 134 may not be provided with the protruding component 135, and the surface 1341 is in contact with the first function button 121 and the second function button 122. Alternatively, a supporting structure with a span may be formed to improve the stability of the fingerprint recognition apparatus.

In this embodiment of this application, in the structure in which the fingerprint recognition apparatus includes a protruding component, the protruding component is used as a key component in contact with the function button. Based on various considerations, related designs and improvements have been made to the protruding component.

In this embodiment of this application, the protruding component and the reinforcement component may be integrally formed, or the protruding component may be assembled on the reinforcement component. This is not limited in this embodiment of this application. In the structure in which the protruding component is assembled on the reinforcement component, from the perspective of ease of mounting, optionally, referring to FIG. 16, the area of the surface 1351 of the protruding component 135 facing the first function button 121 may be designed to be larger. That is, the area of the surface 1351 of the protruding component 135 is larger than the area of the surface 1211 of the first function button 121 close to the protruding component 135.

In this way, the area of the surface of the protruding component facing the function button is larger than the area of the surface of the function button close to the protruding component, so that the size of the protruding component is larger, facilitating the assembly of the protruding component on the reinforcement component.

Figure 16:
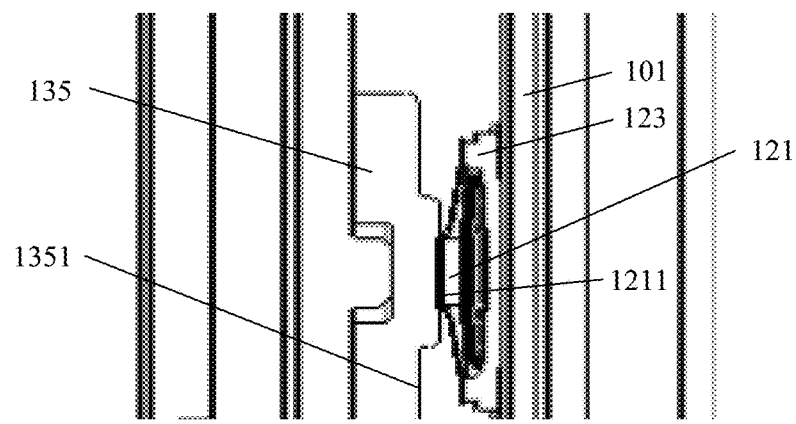
FIG. 16 is a schematic diagram of a partial area of an electronic device on an xy plane according to an embodiment of this application.

It should be understood that the structure of the protruding component 135 shown in FIG. 16 is only an example for description, and any structure meeting the condition that the area of the surface 1351 of the protruding component 135 facing the first function button 121 is larger than the area of the surface 1211 of the first function button 121 close to the protruding component 135 is within the protection scope of this embodiment of this application. For example, the surface 1351 of the protruding component 135 may be a plane.

Further referring to FIG. 16, the first function button 121 is fixed on the middle frame 101 through the supporting member 123. The supporting member 123 is stationary when the first function button 121 is pressed and moved. When the area of the surface 1351 of the protruding component 135 is larger than the area of the surface 1211 of the first function button 121 close to the protruding component 135, and when the fingerprint recognition apparatus 130 is repeatedly pressed, the protruding component 135 may press the supporting member 123, increasing extra contact between the protruding component 135 and the supporting member 123. This leads to unstable contact between the supporting member 123 and the middle frame 101, and thus leading to instability of the first function button 121 and affecting stability of the electronic device.

Figure 17:
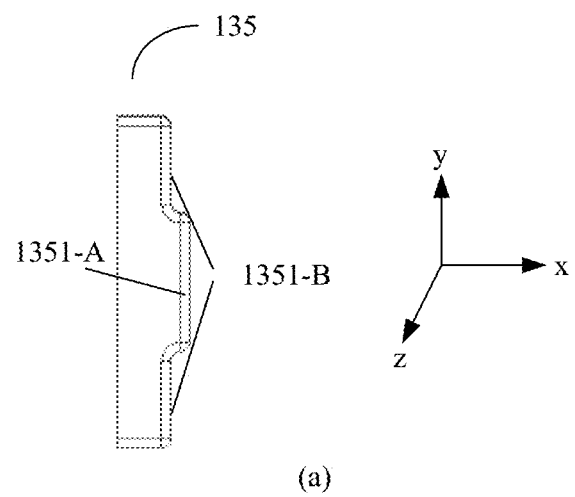
FIG. 17(a) is a schematic diagram of a protruding component on an xy plane according to an embodiment of this application.
FIG. 17(b) is a schematic diagram of a protruding component on a yz plane according to an embodiment of this application.
Figure 17:
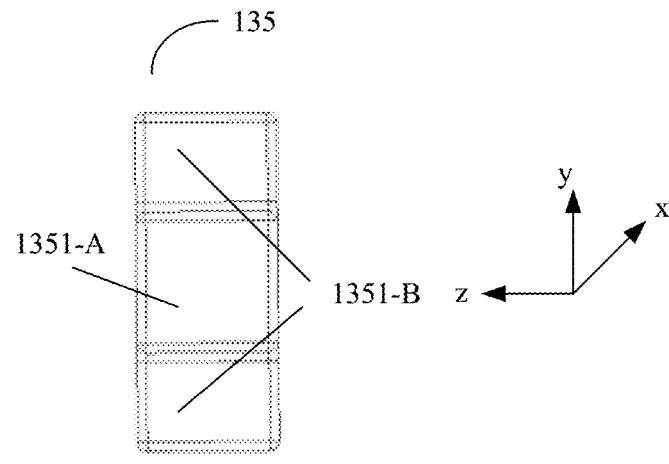

Therefore, optionally, referring to FIG. 17, the surface 1351 of the protruding component 135 facing the first function button 121 is a stepped surface, and the stepped surface includes a convex area 1351-A and a concave area 1351-B. The convex area 1351-A is in contact with the first function button 121, and in the third direction (that is, the y direction), the concave area 1351-B is located on both sides of the convex area 1351-A.

In other words, to reduce the extra contact between the surface 1351 of the protruding component 135 and the supporting member 123 for fixing the first function button 121, both ends of the protruding component 135 may be arranged as the concave area 1351-B, so that the convex area 1351-A is in contact with the first function button 121 to form a protruding component similar to a "chevron" structure.

Therefore, two ends of the surface of the protruding component facing the function button are arranged as a concave area, and the convex area in the middle is in contact with the function button. When the fingerprint recognition apparatus is pressed, extra contact between the surface of the protruding component facing the function button and a supporting member for fixing the function button can be reduced, thereby reducing unstable contact between the supporting member and the middle frame, improving the stability of the function button, and improving the stability of the electronic device.

Figure 18:
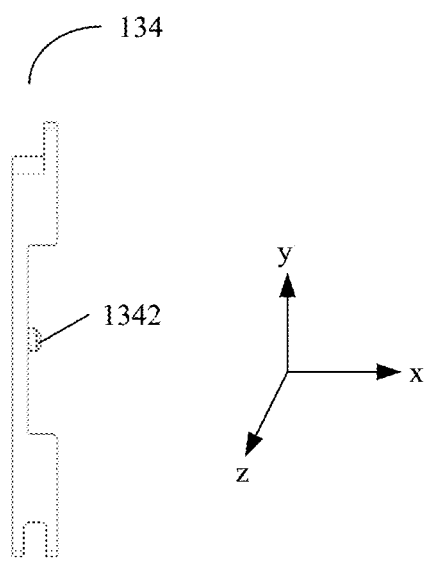
FIG. 18(a) is a schematic diagram of a reinforcement component on an xy plane according to an embodiment of this application.
FIG. 18(b) is a schematic diagram of a protruding component on a yz plane according to an embodiment of this application.
Figure 18:
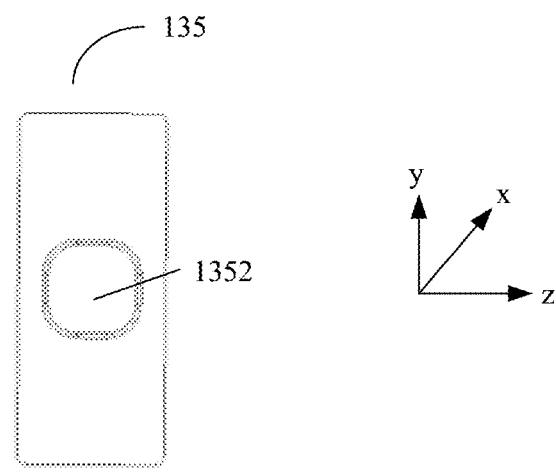

When the protruding component is assembled on the reinforcement component, optionally, referring to FIG. 18, the reinforcement component 134 is provided with a positioning protruding structure 1342, and the protruding component 135 is provided with a positioning hole 1352. The protruding component 135 can be fixed on the reinforcement component 134 through interference fit between the positioning protruding structure 1342 and the positioning hole 1352.

In this embodiment of this application, the design of combining the fingerprint recognition apparatus and the function button into a whole involves a working condition of being pressed during daily use. Therefore, it is necessary to consider the pressing resistance and fatigue resistance of the pad arranged on the substrate. The reason is that if the pressing resistance and fatigue resistance of the pad are poor, the pad may fail, which in turn leads to the failure of the fingerprint recognition apparatus, and seriously reduces the reliability of the fingerprint recognition apparatus.

To improve the performance of the pad, in this embodiment of this application, simulation or actual test verification is performed on possible pressing positions of the fingerprint recognition apparatus to search for a position of the pad that is prone to failure. It is found that an area (denoted as a side area) close to the end of the area (denoted as a pad area) in which the pad is arranged on the substrate is prone to failure. Based on this, in this embodiment of this application, the performance of the pad in the side area can be improved by increasing the area of the pad in the side area. The following describes in detail the specific structure for increasing the area of the pad in the side area.

Figure 19:
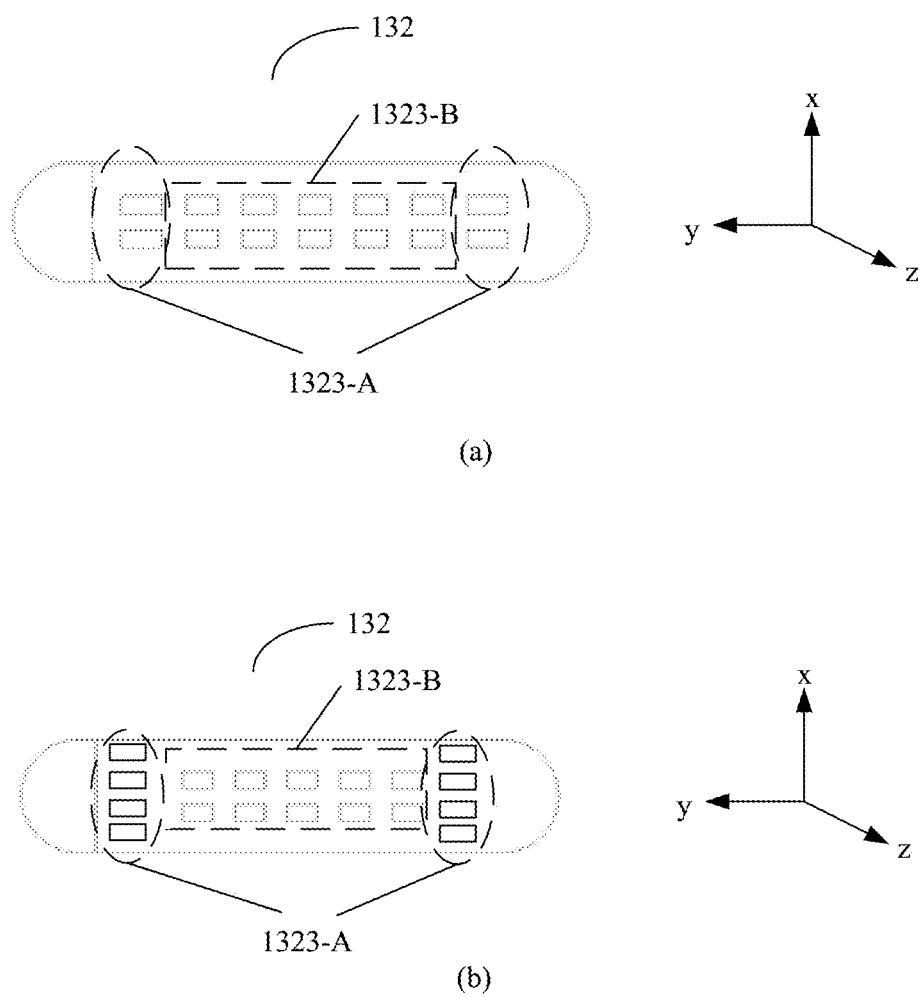
FIG. 19 is a schematic diagram of a substrate on an xy plane according to an embodiment of this application.

In a possible implementation, optionally, referring to FIG. 19(*a*), the pad area includes a side area 1323-A close to the end of the pad area and a middle area 1323-B except for the side area 1323-A. The area of each pad in the side area 1323-A is larger than the area of each pad in the middle area 1323-B.

In this structure, the area of each pad in the side area in which the pad is prone to failure is increased, so that the area of each pad in the side area is larger than an area of a pad in a remaining area. This can increase the contact area of the pad in the side area and reduce the stress, thereby improving the pressing resistance and fatigue resistance of the pad in the side area, increasing the service life of the pad, and further improving the reliability of the fingerprint recognition apparatus.

In another possible implementation, optionally, referring to FIG. 19(*b*), a quantity of pads in the side area 1323-A is larger than a quantity of pads in the middle area 1323-B.

This structure can be understood as increasing the area of the pad in the side area by increasing the quantity of pads in the side area. A quantity of pads for each signal may be added. For example, on the middle area 1323-B, each signal corresponds to one pad, and on the side area 1323-A, two pads may be arranged for each signal, so that when one of the pads for one signal is damaged, the other pad can still support the normal use of the fingerprint recognition apparatus.

In this structure, the quantity of pads in the side area in which the pad is prone to failure is increased to increase a quantity of pads corresponding to each signal, so that when a pad for the same signal is damaged, another pad corresponding to the signal can be used normally, thereby improving the service life of the pad on the substrate as a whole, and further improving the reliability of the fingerprint recognition apparatus.

The foregoing has described in detail the structure of the electronic device equipped with the fingerprint recognition apparatus in the embodiments of this application. The following briefly describes a method for assembling the fingerprint recognition apparatus on the electronic device by using an example.

Step 1: Pass a flexible circuit board 133 of a fingerprint recognition apparatus 130 through a fingerprint hole 1011 on a middle frame 101. Step 2: Push the fingerprint recognition apparatus 130 into the middle frame 101 until the fingerprint recognition apparatus 130 (for example, a protruding component 135 or a reinforcement component 134 in the fingerprint recognition apparatus 130) is in contact with a function button (for example, a first function button 121 and/or a second function button 122) on the middle frame 101. Step 3: Pull up the flexible circuit board 133 slightly to make room, and wait for the next step to mount a stopping assembly 140. Step 4: Mount the stopping assembly 140; place the stopping assembly 140 on a side of the fingerprint hole 1011 close to the function button; insert a partial area of a retaining wall structure 141 of the stopping assembly 140 into an accommodating structure 136 of the fingerprint recognition apparatus 130; and fix the stopping assembly 140 on the middle frame 101 with screws. Step 5: Turn the flexible circuit board 133 over the stopping assembly 140, and then connect the flexible circuit board 133 to a main board through buckling. Step 6: Respectively squeeze two ends of the fingerprint recognition apparatus 130 to check and confirm that the fingerprint recognition apparatus 133 is effectively restricted and fixed on the middle frame 101.

It should be understood that, as described in the embodiments of this application, that an element is "fixed" to another element means that an element can be directly or indirectly fixed to another element. Similarly, as described in the embodiments of this application, "connection" between an element and another element may be direct connection or indirect connection. As described in the embodiments of this application, contact between two elements can be understood as contact within an allowable range of a mounting error, and there may be a small gap caused by the mounting error.

It should be further understood that, as described in the embodiments of this application, that a direction is "parallel to" or "perpendicular to" another direction can be understood as "approximately parallel" or "approximately perpendicular".

Unless otherwise specified, "a and/or b" described in the embodiments of this application includes any one of the following three cases: a, b, and a and b.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, wherein the electronic device comprises:
   a middle frame connected to a first function button, wherein
   a fingerprint hole is arranged on the middle frame, a fingerprint recognition apparatus passing through the fingerprint hole, wherein the fingerprint recognition apparatus is in contact with the first function button, wherein the fingerprint recognition apparatus comprises an accommodating structure, a fingerprint recognition assembly, a flexible circuit board, and a reinforcement component, wherein the flexible circuit board is arranged between the fingerprint recognition assembly and the reinforcement component, and wherein in a first direction, a size of the reinforcement component is smaller than a size of the fingerprint recognition assembly, so that the fingerprint recognition assembly is assembled from the outside of the middle frame to the inside of the middle frame; and a stopping assembly arranged on a side of the fingerprint hole close to the first function button, and is connected to the middle frame, wherein the stopping assembly comprises a retaining wall structure, and the retaining wall structure is partly inserted into the accommodating structure; and wherein in the first direction, a size of a partial area is smaller than a size of movement space, and the movement space comprises space of the accommodating structure on the side of the fingerprint hole close to the first function button; and in a second direction of a first plane and/or a third direction of the first plane, a size of the retaining wall structure is greater than a size of the fingerprint hole, wherein the first direction is perpendicular to the side surface of the middle frame, the first plane is parallel to the side surface of the middle frame, the second direction is a thickness direction of the middle frame, and the third direction is perpendicular to the second direction.

2. The electronic device according to claim 1, wherein the flexible circuit board comprises a first part and a second part, wherein the first part is arranged between the fingerprint recognition assembly and the reinforcement component;

the first part comprises an extension area stretching out of a first end of the fingerprint recognition assembly; and the second part extends from an end of the extension area to the inside of the middle frame, and is fixedly connected to the middle frame.

3. The electronic device according to claim 2, wherein an end of the reinforcement component facing the first end of the fingerprint recognition assembly is formed as a U-shaped structure, and two edges of the U-shaped structure extend outward in the third direction; and, wherein the accommodating structure comprises space formed by an inner surface of the U-shaped structure.

4. The electronic device according to claim 3, wherein the fingerprint recognition apparatus further comprises a protective film, wherein the protective film is attached to a first area on a first surface, the first surface faces to a first part of the fingerprint recognition assembly, and the first area is close to the first end of the fingerprint recognition assembly.

5. The electronic device according to claim 1 wherein each of two ends of the reinforcement component is formed as a claw-shaped structure extending outward, and the accommodating structure is arranged between a surface of each claw-shaped structure facing away from the first function button and the surface of the fingerprint recognition assembly attached to the flexible circuit board.

6. The electronic device according to claim 1, wherein the fingerprint recognition apparatus further comprises a protruding component, the protruding component is arranged on a surface of the reinforcement component facing the first function button, and the protruding component is in contact with the first function button.

7. The electronic device according to claim 6, wherein the surface of the reinforcement component facing the first function button comprises a middle area and two end areas, and the middle area is provided with the protruding component; and the fingerprint recognition apparatus further comprises an elastic member arranged on each of the end areas, and when any one end of the fingerprint recognition apparatus is pressed, the elastic member arranged on the end is in tight contact with the middle frame.

8. The electronic device according to claim 7, wherein the elastic member is foam.

9. The electronic device according to claim 6, wherein the middle frame is further provided with a second function button, the second function button and the first function button are distributed in the third direction, and the protruding component is in contact with both the first function button and the second function button.

10. The electronic device according to claim 6, wherein the surface of the reinforcement component facing the first function button is a stepped surface, the stepped surface comprises a concave area and a convex area, and the protruding component is arranged on the concave area.

11. The electronic device according to claim 6, wherein the surface of the protruding component facing the first function button is a stepped surface, the stepped surface comprises a convex area and a concave area, and the convex area is in contact with the first function button.

12. The electronic device according to claim 6, wherein the protruding component is made of a non-metallic material.

13. The electronic device according to claim 1, wherein the fingerprint recognition apparatus comprises a substrate, a pad area of the substrate is provided with a plurality of pads, the pad area comprises a side area close to an end of the pad area and a middle area except for the side area and an area of each pad in the side area is larger than an area of each pad in the middle area.

14. The electronic device according to claim 1, wherein the fingerprint recognition apparatus comprises a substrate, and a pad area of the substrate being provided with a plurality of pads, wherein the pad area comprises a side area close to an end of the pad area and a middle area except for the side area, wherein a quantity of pads in the side area is larger than a quantity of pads in the middle area.

15. The electronic device according to claim 1, wherein the first function button is a power button.

16. The electronic device according to claim 1, wherein a distance from an inner surface of the fingerprint recognition assembly close to the first end to a first part of the flexible circuit board is longer than a distance from the inner surface of the fingerprint recognition assembly away from the first end to the first part of the flexible circuit board; and, wherein the inner surface is the surface of the fingerprint recognition assembly close to the side of the first function button.

17. The electronic device according to claim 1, wherein an end of the reinforcement component away from the first end of the fingerprint recognition assembly is formed as a claw-shaped structure extending outward, and the accommodating structure is arranged between a surface of the claw-shaped structure facing away from the first function button and the surface of the fingerprint recognition assembly attached to the flexible circuit board.

\* \* \* \* \*